(12) United States Patent
Kang

(10) Patent No.: US 9,872,224 B2
(45) Date of Patent: Jan. 16, 2018

(54) METHOD FOR CONSTRUCTING BEACON TOPOLOGY NETWORK

(71) Applicant: SK Planet Co., Ltd., Seongnam-si, Gyeonggi-do (KR)

(72) Inventor: Kichon Kang, Seoul (KR)

(73) Assignee: SK PLANET CO., LTD., Seongnam-si (KR)

( * ) Notice: Subject to any disclaimer, the term of this patent is extended or adjusted under 35 U.S.C. 154(b) by 0 days.

(21) Appl. No.: 15/297,601

(22) Filed: Oct. 19, 2016

(65) Prior Publication Data

US 2017/0111846 A1 Apr. 20, 2017

(30) Foreign Application Priority Data

| Oct. 19, 2015 | (KR) | 10-2015-0145145 |
| Oct. 19, 2015 | (KR) | 10-2015-0145146 |
| Oct. 30, 2015 | (KR) | 10-2015-0152405 |
| Dec. 16, 2015 | (KR) | 10-2015-0179927 |
| Dec. 16, 2015 | (KR) | 10-2015-0179933 |

(51) Int. Cl.

| H04W 92/00 | (2009.01) |
| H04W 40/24 | (2009.01) |
| H04B 17/318 | (2015.01) |
| H04W 4/02 | (2009.01) |
| H04W 52/28 | (2009.01) |
| H04W 88/16 | (2009.01) |

(52) U.S. Cl.
CPC ........ *H04W 40/244* (2013.01); *H04B 17/318* (2015.01); *H04W 4/023* (2013.01); *H04W 52/283* (2013.01); *H04W 88/16* (2013.01)

(58) Field of Classification Search
CPC ...... H04B 7/0452; H04B 7/0632; H04L 43/08
USPC ....... 455/41.2, 41.1, 456.1, 517, 434, 422.1; 370/311, 254, 338, 221, 256, 235, 312, 370/336, 252; 342/387, 465; 375/133, 375/295; 709/208, 227
See application file for complete search history.

(56) References Cited

U.S. PATENT DOCUMENTS

| 6,831,896 | B1 * | 12/2004 | Lempio | H04W 48/12 370/252 |
| 2003/0231607 | A1 * | 12/2003 | Scanlon | H04W 74/04 370/338 |
| 2005/0177639 | A1 * | 8/2005 | Reunamaki | H04W 84/18 709/227 |
| 2006/0030318 | A1 * | 2/2006 | Moore | H04W 48/10 455/434 |
| 2006/0039450 | A1 * | 2/2006 | Fulton | H04B 1/7156 375/133 |
| 2008/0231511 | A1 * | 9/2008 | Montuno | G01S 5/06 342/387 |
| 2011/0289175 | A1 * | 11/2011 | Lee | H04W 28/26 709/208 |

(Continued)

*Primary Examiner* — Tan H Trinh
(74) *Attorney, Agent, or Firm* — Hauptman Ham, LLP

(57) ABSTRACT

A beacon device connection method implemented by a beacon management server is provided. Also, a method for constructing a beacon network by connecting a plurality of beacon devices is provided. The beacon network construction method may be implemented by a master beacon connected with at least one slave beacon to control the slave beacon and connected with at least one neighboring master beacon or a beacon management server to exchange information.

8 Claims, 25 Drawing Sheets

(56) References Cited

U.S. PATENT DOCUMENTS

| | | | |
|---|---|---|---|
| 2012/0099430 A1* | 4/2012 | Vos | H04W 28/02 370/235 |
| 2013/0170336 A1* | 7/2013 | Chen | H04L 41/12 370/221 |
| 2013/0172036 A1* | 7/2013 | Miklos et al. | H04W 8/005 455/517 |
| 2014/0029596 A1* | 1/2014 | Li | H04W 8/005 370/338 |
| 2014/0247817 A1* | 9/2014 | Lim | H04W 52/0216 370/336 |
| 2014/0307611 A1* | 10/2014 | Tesanovic | H04W 8/005 370/312 |
| 2015/0126188 A1* | 5/2015 | Lindoff | H04W 8/005 455/434 |
| 2015/0131571 A1* | 5/2015 | Fodor | H04W 4/005 370/329 |
| 2015/0379650 A1* | 12/2015 | Theobald | G06Q 50/12 705/15 |
| 2016/0061588 A1* | 3/2016 | Cho | H04M 1/7253 356/614 |
| 2016/0066270 A1* | 3/2016 | Hayes | H04W 52/0216 370/254 |
| 2016/0128049 A1* | 5/2016 | Phillips-Lubimiv | H04L 67/303 370/329 |
| 2017/0013569 A1* | 1/2017 | Braxton | H04W 52/245 |
| 2017/0126818 A1* | 5/2017 | Kang | H04L 67/18 |
| 2017/0127336 A1* | 5/2017 | Kang | H04W 40/244 |

\* cited by examiner

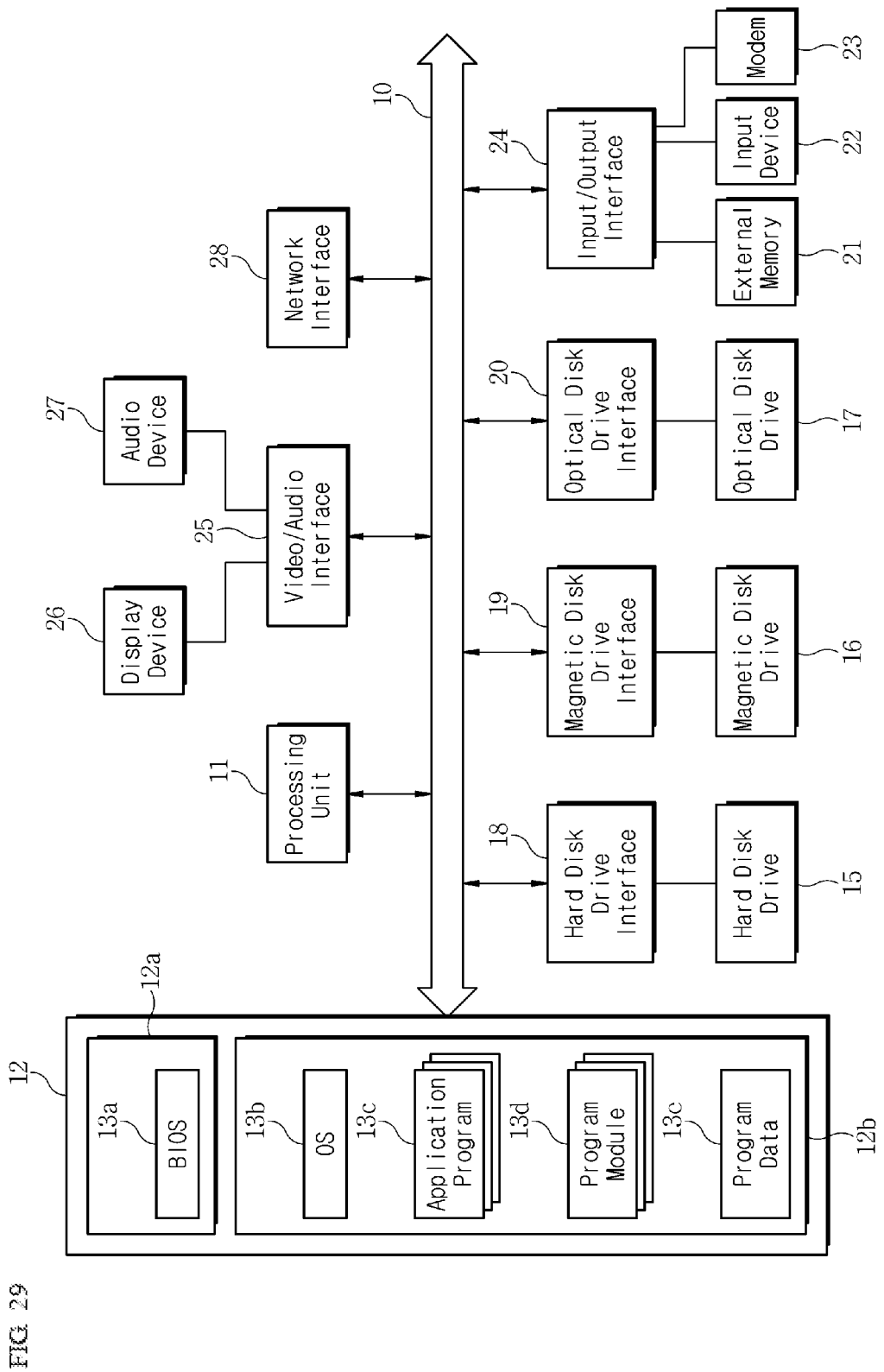

METHOD FOR CONSTRUCTING BEACON TOPOLOGY NETWORK

CROSS REFERENCE TO RELATED APPLICATION

This present application claims the benefit of Korean Patent Application Nos. 10-2015-0145145, filed Oct. 19, 2015, 10-2015-0145146, filed Oct. 19, 2015, 10-2015-0152405, filed Oct. 30, 2015, 10-2015-0179927, filed Dec. 16, 2015, and 10-2015-0179933, filed Dec. 16, 2015, which are hereby incorporated by reference in their entirety into this application.

TECHNICAL FIELD

The present invention relates to beacon network construction technology and, more particularly, to a method for constructing a beacon network by connecting a plurality of beacon devices.

BACKGROUND

Details disclosed in this section merely offers background information regarding embodiments of the present invention. No determination has been made, and no assertion is made, as to whether any of the below might be applicable as prior art with regard to the present invention.

Normally, a wireless network has a star-type structure based on point-to-point or point-to-multipoint topology. Recently, there is a growing interest in a wireless network having a mesh structure based on multipoint-to-multipoint topology like a wired network.

The wireless mesh network has some advantages such as an easy extension of network without the connection with the wired network, a rapid and cost-effective installation of network, the provision of redundancy by multiple paths, the flexibility and extendibility of network, and the like.

A typical wired network environment uses technique to relay a signal through a repeater or wireless router, also referred to as an access point (AP), thus having a wired connection architecture of all APs.

Contrary to this, the mesh network merely requires a wired connection of a representative AP. Then, wireless communication routers, which act as antennas like typical wireless communication base stations, become mesh nodes and hence realize wireless connections in all sections.

This allows a network structure based on wired mesh topology to be applied to a wireless network, thus overcoming limitations of typical wireless LAN. Namely, this may be considered as an extended form of a hotspot zone already constructed by communication companies.

While the hotspot zone allows anyone to access Wi-FI and use a wireless network in a building, the mesh network constructs a wireless network on a large scale such as a resort, a park, a harbor, or any other broader area.

In the mesh network, users can use the network in a similar procedure to access to Wi-Fi. This gives the benefit of realizing a network connection in a disaster situation or in hinterlands incapable of constructing a wired network, and also has the advantage of home networking. Thus, this has recently attracted considerable attention as essential technology in the ubiquitous age.

Meanwhile, with the remarkable development of a mobile communication network and related technologies, today's mobile communication devices have outgrown a typical category of simple communication devices or information providing devices and are now evolving into total entertainment devices.

Such a mobile communication device often has a function of short range communication such as NFC (Near Field Communication) or Bluetooth as well as a traditional communication function using a mobile communication network.

By the way, NFC covers a relatively narrower communication range and needs an additional wireless chip, whereas Bluetooth covers a relatively wider communication range and is inherently applied to most of recent mobile communication devices. In addition, a great variety of communication services using Bluetooth are developed and launched.

Further, a new service for offering various kinds of information to a user's mobile device by utilizing a beacon device based on Bluetooth is being developed and studied. In particular, such a beacon device based on Bluetooth is now applied to the construction of the mesh network.

In order to construct the mesh network in a broader area, a solution for connecting two or more pre-constructed mesh networks is required such as installing a bridge node between mesh networks. According to conventional technique, an administrator or engineer of the mesh network manually checks a connection state of mesh networks and finds a suitable position for installing a new beacon device (e.g., a bridge node). This is not at all effective.

Accordingly, technique to construct a beacon network more effectively and operate the beacon network dynamically depending on network conditions is needed.

SUMMARY

In order to address the aforesaid or any other issue, the present invention provides a method in which a terminal device traveling among a plurality of beacon devices receives beacon signals from the beacon devices within a certain time and transmits received signal time information, received signal strength information, and beacon identification information to a beacon management server, and then the server determines a connectability of the beacon devices, namely, determines whether the beacon devices are connectable with each other.

If it is determined that the beacon devices are connectable with each other, the beacon management server further determines whether to increase emission power of one or more beacon devices or install a new beacon device among the beacon devices so as to connect such beacon devices. Namely, this invention provides more effective technique to connect a plurality of beacon devices.

The present invention is not limited to the above object, and any other object, even though not mentioned herein, may be well understood from the following description.

According to various embodiments of this invention, a beacon device connection method may be implemented by a beacon management server. This method may comprise steps of: collecting, from a terminal device, information about a received time of each of beacon signals received from beacon devices by the terminal device; comparing the received time information with regard to the beacon signals; and determining connectability of the beacon devices being different from each other in identification information when a difference between the received times is within a predetermined value.

Additionally, according to various embodiments of this invention, a beacon network construction method may be implemented by a master beacon connected with at least one slave beacon to control the slave beacon and connected with at least one neighboring master beacon or a beacon management server to exchange information. This method may comprise steps of: checking a signal recognition rate measured for signals emitted by the at least one slave beacon for a predetermined time, checking, by using current state information, whether to operate as a gateway beacon capable of connection with the at least one neighboring master beacon, checking, based on a predetermined condition, whether there is a need to change an operating mode, or checking received signal strength of a beacon signal emitted to a terminal device and an arrival rate of a message delivered to the beacon management server; and constructing a beacon network by determining connections with the at least one neighboring master beacon, the at least one slave beacon, and the beacon management server, based on checked information.

According to the present invention, using received signal time information, received signal strength information and beacon identification information of beacon signals received by a terminal device that travels among a plurality of beacon devices, a beacon management server may determine whether the beacon devices are connectable with each other. If it is determined that the beacon devices are connectable with each other, the beacon management server may further determine whether to increase emission power of one or more beacon devices or install a new beacon device among the beacon devices. This may provide an effective method for connecting a plurality of beacon devices.

Additionally, according to the present invention, a master beacon measures periodically a signal recognition rate of each slave beacon connected thereto, disconnects a specific slave beacon having the signal recognition rate smaller than a critical value, searches for another master beacon suitable for managing the disconnected slave beacon, and then connects a found master beacon with the disconnected slave beacon. This may allow a beacon network to be managed more effectively.

Also, the present invention may construct a beacon network more effectively by changing dynamically a beacon device, which performs the function of a gateway, depending on network conditions, by enabling a master beacon to perform the function of a slave beacon, or by selecting a master beacon to be connected on the basis of beacon signal received strength and a keep alive message.

Other various advantages and effects will be disclosed explicitly or implicitly in embodiments of this invention to be described below in detail.

BRIEF DESCRIPTION OF THE DRAWINGS

FIG. 29 is a block diagram illustrating an operating environment of an apparatus for supporting a beacon network construction method according to an embodiment of the present invention.

DETAILED DESCRIPTION

Figure 1:
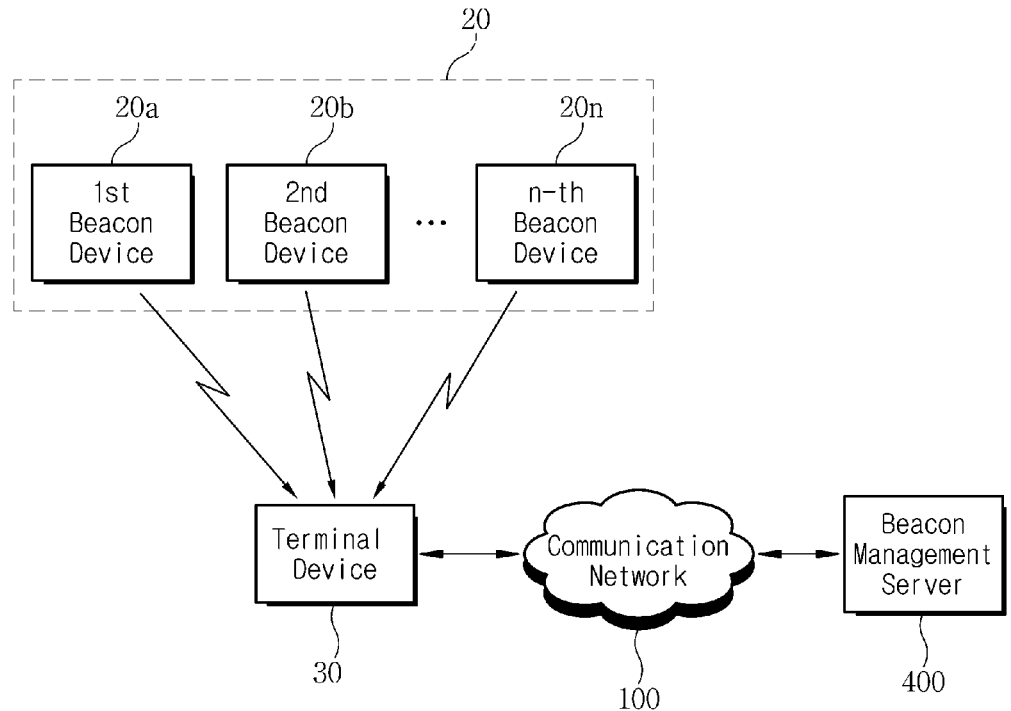
FIG. 1 is a diagram illustrating a system for supporting a beacon network construction method according to the first embodiment of the present invention.

Now, embodiments of the present invention will be described with reference to the accompanying drawings.

In the following description and the accompanying drawings, however, well known techniques may not be described or illustrated in detail to avoid obscuring the subject matter of the present invention. Through the drawings, the same or similar reference numerals denote corresponding features consistently.

The terms and words used in the following description, drawings and claims are not limited to the bibliographical meanings and are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

The expression "1", "2", "first", or "second" used in various embodiments of this disclosure may modify various elements of such embodiments but does not limit the corresponding elements. The above expressions do not limit the sequence and/or importance of the elements but may be used for distinguishing one element from other elements. For example, a first device and a second device indicate different devices although both of them are devices. Meanwhile, without departing from the scope of the present disclosure, a first structural element may be referred to as a second structural element. Similarly, the second structural element also may be referred to as the first structural element.

When it is stated that a certain element is "coupled to" or "connected to" another element, the element may be directly coupled or connected to another element, or a new element may exist between both elements. In contrast, when it is stated that a certain element is "directly coupled to" or "directly connected to" another element, a new element does not exist between both elements.

The terms used in describing various embodiments of this disclosure are only examples for describing a specific embodiment but do not limit such embodiments. Singular forms are intended to include plural forms unless the context clearly indicates otherwise. Unless defined differently, all terms used herein, which include technical terminologies or scientific terminologies, have the same meaning as that understood by a person skilled in the art to which the present disclosure belongs. The terms "include", "comprise", and "have" as well as derivatives thereof, mean inclusion without limitation.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links (of possibly different speeds) that enable the transport of electronic data between computer systems and/or modules (e.g., hardware and/or software modules). When information is transferred or provided over a network or another communications connection (either hardwired, wireless, or a combination of hardwired or wireless) to a computer system, the connection is properly viewed as a computer-readable medium. Computer-executable instructions include, for example, instructions and data which cause a general-purpose computer system or special-purpose computer system to perform a certain function or group of functions. The computer executable instructions may be, for example, binaries, intermediate format instructions such as assembly language, or even source code.

Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

Hereinafter, a beacon network construction method using beacon technology according to this invention will be described on the basis of data communication technology using Bluetooth low energy (BLE) technique. This invention is, however, not limited to Bluetooth or BLE only and may further or alternatively employ any other short range communication technique, based on a personal area network (PAN), such as Zigbee, ultra wideband (UWB), ANT, Wi-Fi, NFC, or the like.

Embodiments of this invention do not necessarily require a state in which a wireless mesh network is constructed. Even though a wireless mesh network is not constructed, various embodiments of this invention may be applicable when a plurality of beacon devices are constructed in a certain area and activated.

Now, at the outset, a system that supports a beacon network construction method according to embodiments of this invention will be described.

Specifically, the beacon network construction method may be implemented through five embodiments, as follows.

The first embodiment of the present invention will focus on a process of determining the connectability of beacon devices by using received time information of a beacon signal. The second embodiment will focus on a process of changing dynamically a constructed beacon network by using a signal recognition rate. The third embodiment will focus on a process of determining, based on current state information, whether to change the operation of a master beacon. The fourth embodiment will focus on a process of changing an operating mode to a master beacon or a slave beacon. The fifth embodiment will focus a process of changing dynamically a beacon network by using received signal strength and a message arrival rate.

Hereinafter, a system that supports a beacon network construction method according to the first embodiment of the present invention will be described.

FIG. 1 is a diagram illustrating a system for supporting a beacon network construction method according to the first embodiment of the present invention.

Referring to FIG. 1, the system according to the first embodiment of this invention may be configured to include a plurality of beacon devices 20, a terminal device 30, and a beacon management server 400.

Although the terminal device 30 transmits or receives data to or from the beacon devices 20 through BLE communication technique, this is exemplary only and not to be construed as a limitation. As mentioned above, any other short range communication technique may be alternatively applied. The terminal device 30 is connected to and interworks with the beacon management server 400 through a communication network 100.

Hereinafter, each element will be described in detail with reference to FIG. 1.

The communication network 100 performs a function to deliver data for transmission and reception of data between the terminal device 30 and the beacon management server 400. The communication network 100 may use wireless communication technique such as, but not limited to, WLAN (Wireless Local Access Network), Wi-Fi, Wibro, Wimax, HSDPA (High Speed Downlink Packet Access), LTE (Long Term Evolution), LTE-A (LTE-Advanced), or the like. Alternatively or additionally, depending on system types, the communication network 100 may use wired communication technique such as Ethernet, xDSL (ADSL, VDSL), HFC (Hybrid Fiber Coaxial cable), FTTC (Fiber To The Curb), FTTH (Fiber To The Home), or the like.

Additionally, the communication network 100 includes a plurality of access networks (not shown) and a core network (not shown), and may further include an external network, e.g., Internet (not shown). Here, the access network is to perform wired/wireless communication with the terminal device 30 and may be formed of a plurality of base stations, also referred to as BTS (Base Transceiver Station), NodeB, or eNB (eNodeB or evolved Node B), and controllers such as BSC (Base Station Controller) and RNC (Radio Network Controller). Additionally, instead of such a base station that includes a digital signal processor and a radio signal processor, a plurality of radio units (not shown) corresponding to the radio signal processor may be disposed respectively at a plurality of regions and connected to a centralized digital unit (not shown) corresponding to the digital signal processor.

The core network which forms a mobile network together with the access network performs a function to connect the access network and the external network such as Internet.

The core network is a network system that performs main functions for a mobile communication service such as mobility control and switching between the access networks. Namely, the core network performs circuit switching or packet switching and further manages and controls a packet flow in the mobile network.

In addition, the core network may manage mobility between frequencies, control traffic therein and in the access network, and control interworking with other network such as Internet. The core network may be formed of SGW (Serving GateWay), PGW (PDN GateWay), MSC (Mobile Switching Center), HLR (Home Location Register), MME (Mobile Mobility Entity), HSS (Home Subscriber Server), and/or the like.

The Internet is a world common network through which information is exchanged according to TCP/IP protocol. The Internet is connected to the terminal device 30 and may deliver information, offered from the terminal device 30, to the beacon management server 400 through the core network and the access network. Similarly, the Internet may deliver information, offered from the beacon management server 400, to the terminal device 30 through the core network and the access network. This is, however, exemplary only and not to be construed as a limitation. Alternatively, the beacon management server 400 may be integrated with the core network.

In addition to the above-discussed communication technique, any other communication technique well known in the art or to be developed may be used for this invention.

The beacon device 20 refers to a device which is installed at a certain location for a typical beacon service and emits periodically a beacon signal. This beacon signal may contain beacon identification information, such as device information or location information, allocated to the beacon device 20. Such beacon identification information is the basis used for the terminal device 30 to use a beacon service.

Particularly, the beacon identification information may include information about an installed location of the beacon device and information about a mesh network to which the beacon device belongs. This information may be used in determining whether the beacon devices are in a connectable state.

The terminal device 30 refers to a user's device capable of transmitting and receiving various kinds of data via the communication network 100 in response to user's manipulations.

The terminal device 30 may perform voice or data communication through the communication network 100, transmit or receive information to or from the beacon management server 400 through the communication network 100, and receive information from the beacon device 20 by means of beacon-based communication.

For the above, the terminal device 30 may have a memory for storing programs and protocols for transmitting, receiving and processing a beacon signal, a microprocessor for executing and controlling various programs, and the like.

The terminal device 30 may perform the access to any application provider (not shown) such as App Store on the communication network 100, receive a beacon service application from the application provider, and install the beacon service application for receiving a beacon signal and showing content corresponding to the beacon signal. The terminal device 30 may execute the beacon service application, extract beacon identification information from the beacon signal, and transmit the extracted information to the beacon management server 400.

In this embodiment, if beacon signals are received from the beacon devices 20, the terminal device 30 transmits, to the beacon management server 400, identification information contained in each received beacon signal and information about a received time of each beacon signal.

In this case, the terminal device 30 may further transmit, to the beacon management server 400, information about received signal strength of each beacon signal.

Meanwhile, since the respective beacon devices 20 emit beacon signals periodically, the terminal device 30 may receive the beacon signals periodically within a beacon signal emission region of each beacon device 20. Thus, whenever the beacon signal is received, the terminal device 30 may transmit the above-mentioned information to the beacon management server 400.

The terminal device 30 may be implemented in various forms. For example, the terminal device 30 disclosed herein may be a mobile device such as a smart phone, a tablet PC, a PDA (Personal Digital Assistant), a PMP (Portable Multimedia Player), an MP3 player, and the like, or a stationary device such as a smart TV, a desktop computer, and the like.

Additionally, according to a recent trend of convergence in digital devices, a great variety of mobile devices or their equivalences may be used as the terminal device 30 in the present invention. Furthermore, any device that allows a beacon service application to be downloaded and installed may be used as the terminal device 30 in embodiments of this invention.

The beacon management server 400 may receive, from the terminal device 30, beacon identification information, received signal time information, and received signal strength information, and then determine a connectability of the beacon devices, namely, determines whether the beacon devices are connectable with each other.

If a difference in received signal time between the beacon signals that are received from the terminal device 30 is within a predetermined time interval, the beacon management server 400 may determine that the beacon devices 20 corresponding to the beacon identification information received from the terminal device 30 are connectable with each other.

In this case, the beacon signals which are targets of calculating the received signal time difference should contain different identification information. The reason is that the same identification information means one beacon device and thus there is no need for connection.

For example, if a predetermined time interval is two seconds, if the received signal time of a beacon signal emitted by the first beacon device 20*a* is 15:02:30, and if the received signal time of a beacon signal emitted by the second beacon device 20b is 15:02:31, it may be determined that the first and second beacon devices 20a and 20b are connectable with each other.

If the received signal times of beacon signals emitted respectively by the first and second beacon devices 20a and 20b are 15:02:30 and 15:02:35 which exceed the predetermined time interval, the beacon management server 400 may determine that the first and second beacon devices 20a and 20b are not connectable with each other.

Also, the beacon devices 20 may form a single node of the wireless mesh network. In this case, the beacon management server 400 identifies the network connection information of the beacon devices 20, based on the beacon identification information received from the terminal device 300. Then, if two or more beacon devices 20 are connected with different beacon networks, the beacon management server 400 may determine that the beacon devices 20 connected with different beacon networks are connectable with each other.

For example, if the first and second beacon devices 200a and 200b are connected with the same beacon network, these beacon devices have been already connected with each other directly or indirectly. In this case, since there is no need for connection, the beacon management server 400 may determine that the first and second beacon devices 200a and 200b are not connectable with each other.

However, such cases may vary depending on connection types of the beacon network and/or reasons of connection. If the first and second beacon devices 200a and 200b are connected with each other indirectly, the beacon management server 400 may calculate the hop number of the first and second beacon devices 200a and 200b through identification information or any other information of the first and second beacon devices 200a and 200b and then, if the calculated hop number is greater than a given value, enable the first and second beacon devices 200a and 200b to be connected with each other.

Meanwhile, the beacon management server 400 may estimate a distance between the beacon devices 20, based on several pieces of information about received signal strength collected for a certain time. Then, if the estimated distance is within a given value, the beacon management server 400 may determine that the beacon devices 200a and 200b are connectable with each other.

In this case, a many-to-one mapping relation is required with regard to the received signal strength information and the beacon information corresponding to the identification information. Namely, there should be two or more beacon devices, and each beacon device should be mapped to two or more pieces of received signal strength information.

For example, let's suppose that a predetermined distance is 5 m and the terminal device 30 moves for 10 seconds. Further, let's suppose that the terminal device 30 receives a beacon signal from the first beacon device 20a twice for 10 seconds and also receives a beacon signal from the second beacon device 20b twice for 10 seconds. If the received signal strength of two signals received from the first beacon device 20a becomes weaker, this means that the terminal device 30 is receding from the first beacon device 20a. If the received signal strength of two signals received from the second beacon device 20b becomes stronger, this means that the terminal device 30 is approaching the second beacon device 20b. Thus, from such information, it is possible to estimate a variation in distance between the terminal device 30 and each beacon device 20 for a certain time. Based on this estimated information and distance information from each beacon device 20, it is possible to further estimate a distance between the beacon devices. For example, if it is estimated that a distance between the first and second beacon devices 20a and 20b is 3 m, the estimated distance is within the predetermined distance 5 m. Therefore, the beacon management server 400 may determine that the first and second beacon devices 20a and 20b are connectable with each other.

Namely, by analyzing the signal strength information collected for a certain time with regard to the beacon devices 20, the beacon management server 400 may extract a signal strength variation pattern of the beacon devices 20 according to the movement of the terminal device 30, estimate a distance between the beacon devices 20 by considering the signal strength variation pattern, and determine connectability of the beacon devices on the basis of the estimated distance.

Additionally, the beacon management server 400 may collect location information of the terminal device 30 and then, by further considering the collected location information, estimate a distance between the beacon devices 20.

The above-discussed distance calculation or estimation does not always rely on the received signal strength information. Alternatively, the beacon management server 400 may detect the location of each beacon device 20, based on the beacon identification information received from the terminal device 30, and then calculate a distance between the beacon devices 20.

When it is determined that two or more of the beacon devices 20 are connectable with each other, the beacon management server 400 may increase the strength of emission power of at least one of the connectable beacon devices 20 so as to connect the connectable beacon devices.

Further, a new beacon device for connection may be installed between the connectable beacon devices 20. In this case, the beacon management server 400 may calculate an installation location of such a new beacon device, based on locations of the beacon devices 20 or a distance between the beacon devices 20.

The beacon management server 400 may determine a specific one of the above-discussed two methods for connecting the beacon devices 20, based on setting or surrounding environments. In an embodiment, the beacon management server 400 may predetermine a critical value of emission power of the beacon devices, namely, maximally increasable emission power, in view of a battery consuming rate of each beacon device and the performance of each beacon device. If the connection of the beacon devices is allowed with emission power smaller than the critical value, the beacon management server 400 may increase the emission power. However, if the connection of the beacon devices requires emission power greater than the critical value, the beacon management server 400 may calculate an installation location of a new beacon device rather than increasing the emission power.

Of course, the above methods may be used together. Namely, the beacon management server 400 may use a new beacon device between the connectable beacon devices while increasing somewhat the emission power.

Further, the beacon management server 400 may manage the beacon devices 20, receive beacon identification information from the terminal device 30, identify specific content (e.g., a discount coupon, a membership benefit, etc.) corresponding to the received beacon identification information, and offer the identified content to the terminal device 30. Also, the beacon management server 400 may receive various contents to be mapped to the beacon identification information from a manager's terminal or server, and then manage the received contents.

In addition, the beacon management server 400 may receive state information from respective master beacons and then, based on the received state information, select a beacon device to be operated as a gateway beacon from among such master beacons or support a process for constructing the beacon network dynamically.

In view of hardware, the service management server 400 according to an embodiment of this invention has the same configuration as a typical web server or network server. However, in view of software, the service management server 400 includes a program module having codes written in computer languages such as C, C++, Java, Visual Basic, Visual C, and the like.

Described hereinbefore is the system for supporting the beacon network construction method according to the first embodiment of this invention.

Now, a system that supports a beacon network construction method according to the second embodiment of this invention will be described.

While the above-described first embodiment focuses on a process of determining the connectability of beacon devices by using received time information of beacon signals emitted from the beacon devices, the second to fifth embodiments will focus on a process of changing dynamically the already constructed beacon device by using various rules. In these cases, the beacon devices may be classified into a master beacon and a slave beacon, depending on functions and operations thereof. In the following description, the master beacon and the slave beacon may be indicated by reference numerals 200 and 300, respectively, or sometimes referred to as the beacon devices 20.

Elements and functions previously discussed with reference to FIG. 1 will be omitted hereinafter.

Figure 2:
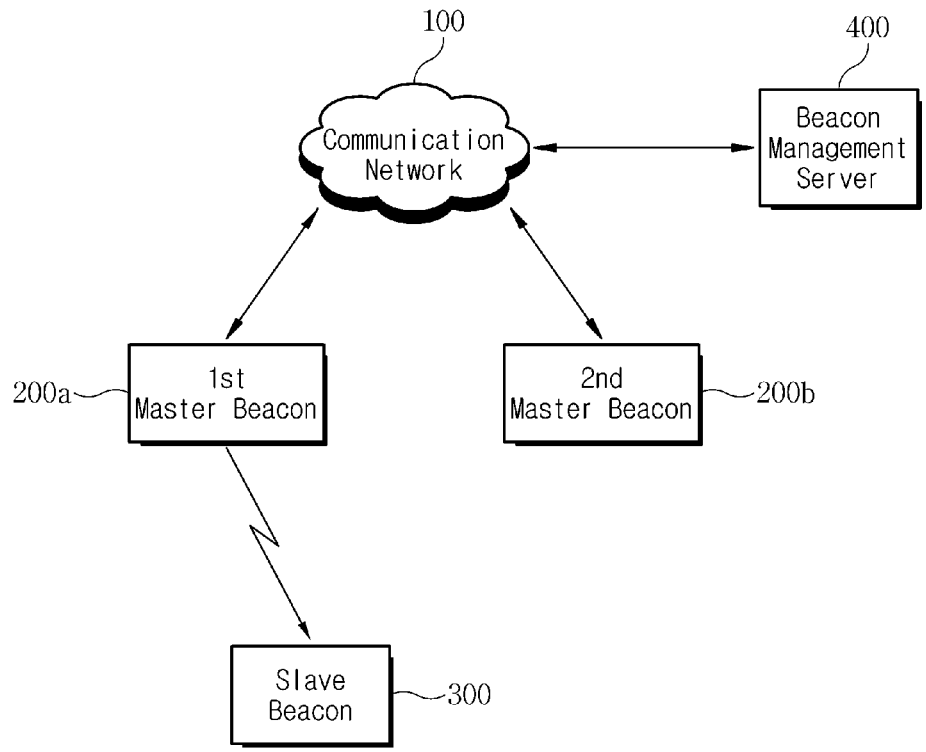
FIG. 2 is a diagram illustrating a system for supporting a beacon network construction method according to the second embodiment of the present invention.

FIG. 2 is a diagram illustrating a system for supporting a beacon network construction method according to the second embodiment of the present invention.

Referring to FIG. 2, when at least two beacon devices 20 shown in FIG. 1 are connected with each other under the control of the beacon management server 400, the connected beacon devices 20 may be classified into a master beacon and a slave beacon depending on functions and operations thereof as mentioned above.

For the convenience of illustration, let's suppose that there are two master beacons and one slave beacon in the second embodiment. The first master beacon manages the slave beacon, and the second master beacon will manage the slave beacon when a connection between the first master beacon and the slave beacon is released. This is, however, exemplary only and not to be construed as a limitation. The functions of the first and second master beacons may be changed. Also, each master beacon may not necessarily manage one slave beacon only and may manage two or more slave beacons. Namely, any other slave beacon in addition to the illustrated slave beacon may be under the management of the first master beacon, and also the second master beacon may already manage any other slave beacon in addition to the illustrated slave beacon. Namely, there may be two or more master beacons and two or more slave beacons.

Referring to FIG. 2, the system for supporting the method for constructing the beacon network may include a plurality of master beacons 200, a slave beacon 300 (or a plurality of slave beacons 300), and a beacon management server 400.

Although the master beacon 200 transmits or receives data to or from the slave beacon 300 through BLE communication technique, this is exemplary only and not to be construed as a limitation. As mentioned above, any other short range communication technique may be alternatively applied. The master beacon 200 is connected to and interworks with the beacon management server 400 through a communication network 100.

In the second embodiment, each of the master beacon 200 and the slave beacon 300 refers to a device which is installed at a certain location for a typical beacon service and periodically emits a beacon signal. This beacon signal may contain beacon identification information, such as device information or location information, allocated to each of the master beacon 200 and the slave beacon 300. Such beacon identification information is the basis used for a terminal device to use a beacon service.

Particularly, the master beacon 200 is connected with the slave beacon 300 through a short range communication network (e.g., PAN) and manages the slave beacon 300. Also, the master beacon 200 controls the slave beacon 300 by sending a specific command message or request message to the slave beacon 300.

The master beacon 200 may manage one or more slave beacons 300 and be connected with any other master beacon 200 through a short range communication network (e.g., PAN).

Also, the master beacon 200 may be controlled by the beacon management server 400 through the communication network 100.

As mentioned above, the slave beacon 300 is controlled by the master beacon 200 connected thereto through a short range communication network.

The master beacon 200 and the slave beacon 300 may be connected with each other through pairing and bonding. Particularly, in order to maintain this connection with the slave beacon 300, the master beacon 200 may measure a signal recognition rate of the slave beacon 300 through periodically transmitted and received signals.

In this disclosure, the signal recognition rate refers to a rate of signals detected at predetermined signal strength or more from among signals periodically emitted for a given time by the slave beacon.

The beacon management server 400 may receive, from the master beacon 200 (e.g., the first master beacon 200*a*), a request for disconnection from the slave beacon 300. In response to the received request, the beacon management server 400 may find an alternative path, approve the disconnection request, and send a request for connection with the slave beacon 300 to another master beacon 200 (e.g., the second master beacon 200*b*) being connectable with the slave beacon 300.

Namely, the beacon management server 400 may send, to the master beacon 200 being controlled by the beacon management server 400, a request for connection with or disconnection from the slave beacon 300, thus managing and controlling a connection state of the beacon network.

According to the second embodiment, the master beacon may periodically measure the signal recognition rate of the slave beacon and be disconnected from the slave beacon having the signal recognition rate smaller than a predetermined critical value. Also, the beacon management server may find another master beacon suitable for managing the disconnected slave beacon and connect the found master beacon with the disconnected slave beacon. This allows an effective management of a wireless mesh network.

Now, a system that supports a beacon network construction method according to the third embodiment of this invention will be described.

Figure 3:
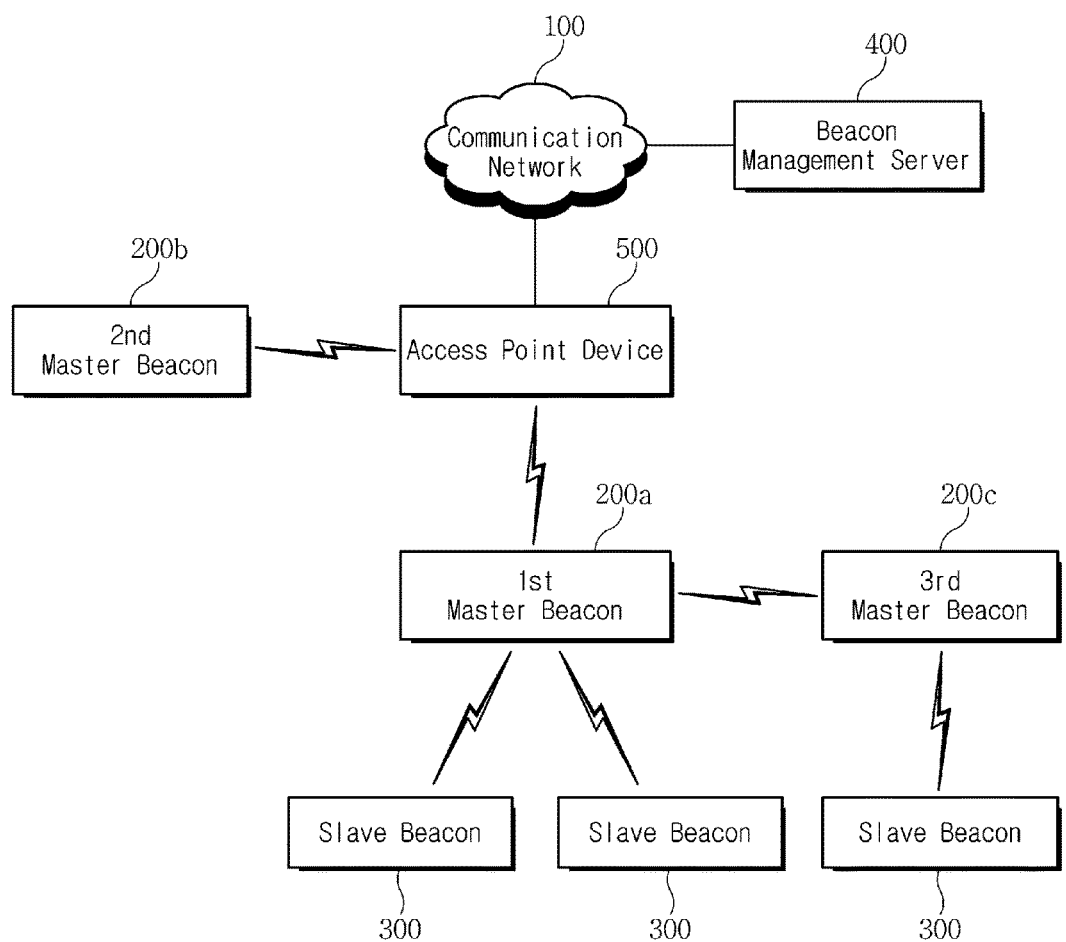
FIG. 3 is a diagram illustrating a system for supporting a beacon network construction method according to the third embodiment of the present invention.

FIG. 3 is a diagram illustrating a system for supporting a beacon network construction method according to the third embodiment of the present invention.

Referring to FIG. 3, the system according to this embodiment includes a plurality of beacon devices each of which emits a beacon signal at certain coverage. As discussed above, these beacon devices may be composed of master beacons 200 and slave beacons 300.

As earlier discussed, the master beacon 200 is connected with the slave beacon 300 through a short range communication network (e.g., PAN) and manages the slave beacon 300. Also, the master beacon 200 controls the slave beacon 300 by sending a specific command message or request message to the slave beacon 300.

The master beacon 200 may manage one or more slave beacons 300 and be connected with any other master beacon 200 through a short range communication network (e.g., PAN). Also, the master beacon 200 may be controlled by the beacon management server 400 through the communication network 100.

The slave beacon 300 is controlled by the master beacon 200 connected thereto through a short range communication network.

The master beacon 200 and the slave beacon 300 may be connected with each other through pairing and bonding. In order to maintain this connection with the slave beacon 300, the master beacon 200 may measure a signal recognition rate of the slave beacon 300 through periodically transmitted and received signals. As mentioned above, the signal recognition rate refers to a rate of signals detected at predetermined signal strength or more from among signals periodically emitted for a given time by the slave beacon.

Additionally, the slave beacon 300 may be connected under the control of the master beacon 200 so as to access the beacon management server 400. The slave beacon 300 may be connected through another master beacon changed depending on system circumstances or in response to a request. On the other hand, the master beacon 200 may be connected with the communication network 100 through an access point (AP) device 500 and then transmit or receive information or data to or from the beacon management server 400 via the communication network 100.

In this beacon network system, the master beacon 200 may be selectively connected with the AP device 500 if necessary. Namely, although having a communication module capable of connection with the communication network 100 through the AP device 500, the master beacon 200 may be connected with another master beacon rather than connected with the AP device 500, depending on predefined setting or network circumstances. As shown in FIG. 3, each of the first master beacon 200a and the second master beacon 200b is connected with the communication network 100 through the AP device 500. Therefore, the first and second master beacons 200a and 200b may transmit or receive information to or from the beacon management server 400 at any time.

On the other hand, although managing the slave beacon 300 and being able to be connected with the communication network through the AP device 500, the third master beacon 200c may be connected, like the slave beacon, with another master beacon (e.g., the first master beacon 200a). Therefore, under the control of the first master beacon 200a, the third master beacon 200c may transmit or receive information to or from the beacon management server 400. The third master beacon 200c connected with the first master beacon 200a may be set to be directly connected with the AP device 500.

Like the first master beacon 200a, the master beacon acting as a gateway in this disclosure refers to a beacon device that is currently connected with the communication network 100 through the AP device 500 and also connected with one or more of another master beacon and slave beacons.

In this beacon network structure, the first master beacon 200a that currently performs the function of a gateway beacon may share state information with any neighboring master beacon. Namely, the first master beacon 200a may emit a signal within a certain radius in accordance with WiFi communication protocol or any other equivalent. Also, the first master beacon 200a may receive a response from another master beacon such as the second master beacon 200b or the third master beacon 200c. The first master beacon 200a that receives such a response may determine whether the first master beacon 200a is suitable for the function of a gateway beacon. If it is determined that the first master beacon 200a is suitable, the first master beacon 200a may continuously perform the function of a gateway beacon. If it is determined that the first master beacon 200a is not suitable, the first master beacon 200a may determine another master beacon and then request the determined master beacon to perform the function of a gateway beacon. This determination may be performed by all master beacons 200. Therefore, the first master beacon 200a which is acting as a gateway beacon may stop the function of a gateway beacon in response to a request of another master beacon such as the second master beacon 200b or the third master beacon 200c.

Additionally, if the first master beacon 200a is connected with too many slave beacons or if the first master beacon 200a has abnormal performance, the first master beacon 200a may request the second master beacon 200b to perform the function of a gateway beacon. Therefore, the slave beacon 300 connected with the first master beacon 200a may be connected with the second mater beacon 200b instead of the first master beacon 200a. In this case, the third master beacon 200c connected with the first master beacon 200a may be disconnected from the first master beacon 200a and then operate as an independent gateway beacon or connected with the second master beacon 200b continuously.

As discussed hereinbefore, a suitable master beacon for a gateway beacon may be selected on the basis of determination of master beacons, and the slave beacon may be connected with the selected master beacon. Therefore, a network structure may be reestablished dynamically depending on circumstances of a beacon network.

Now, a system that supports a beacon network construction method according to the fourth embodiment of this invention will be described.

Figure 4:
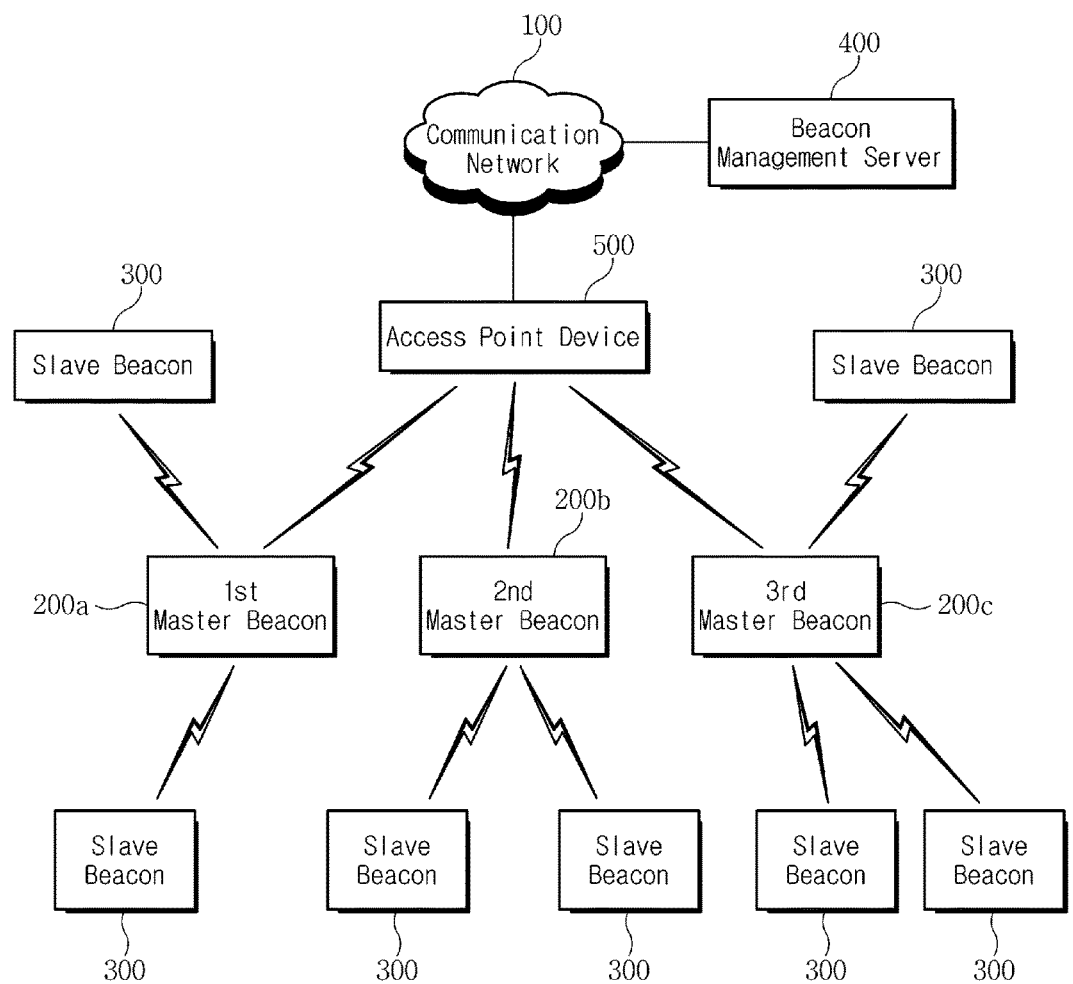
FIG. 4 is a diagram illustrating a system for supporting a beacon network construction method according to the fourth embodiment of the present invention.

FIG. 4 is a diagram illustrating a system for supporting a beacon network construction method according to the fourth embodiment of the present invention.

Referring to FIG. 4, the system according to this embodiment includes a plurality of beacon devices each of which emits a beacon signal at certain coverage. As discussed above, these beacon devices may be classified into master beacons 200 and slave beacons 300.

The master beacon 200 is connected with the slave beacon 300 through a short range communication network (e.g., PAN) and manages the slave beacon 300. Also, the master beacon 200 controls the slave beacon 300 by sending a specific command message or request message to the slave beacon 300.

The master beacon 200 may manage one or more slave beacons 300 and be connected with any other master beacon 200 through a short range communication network (e.g., PAN). Also, the master beacon 200 may be controlled by the beacon management server 400 through the communication network 100.

The slave beacon 300 is controlled by the master beacon 200 connected thereto through a short range communication network.

The master beacon 200 and the slave beacon 300 may be connected with each other through pairing and bonding. In order to maintain this connection with the slave beacon 300, the master beacon 200 may measure a signal recognition rate of the slave beacon 300 through periodically transmitted and received signals. As mentioned above, the signal recognition rate refers to a rate of signals detected at predetermined signal strength or more from among signals periodically emitted for a given time by the slave beacon.

Additionally, the slave beacon 300 may be connected under the control of the master beacon 200 so as to access the beacon management server 400. The slave beacon 300 may be connected through another master beacon changed depending on system circumstances or in response to a request. On the other hand, the master beacon 200 may be connected with the communication network 100 through an access point (AP) device 500 and then transmit or receive information or data to or from the beacon management server 400 via the communication network 100.

In this beacon network system, the master beacon 200 may be selectively connected with the AP device 500 if necessary. Namely, although having a communication module capable of connection with the communication network 100 through the AP device 500, the master beacon 200 may be connected with another master beacon rather than connected with the AP device 500, depending on predefined setting or network circumstances. As shown in FIG. 4, each of the first master beacon 200*a*, the second master beacon 200*b* and the third master beacon 200*c* is connected with the communication network 100 through the AP device 500. Therefore, the respective master beacons 200*a*, 200*b* and 200*c* may transmit or receive information to or from the beacon management server 400 at any time.

In this beacon network structure, the first master beacon 200*a* that currently performs the function of a gateway beacon may share state information with any neighboring master beacon. Namely, the first master beacon 200*a* may emit a signal within a certain radius in accordance with WiFi communication protocol or any other equivalent. Also, the first master beacon 200*a* may receive a response from another master beacon such as the second master beacon 200*b* or the third master beacon 200*c*. The first master beacon 200*a* that receives such a response may determine whether the first master beacon 200*a* is suitable for the function of a gateway beacon. If it is determined that the first master beacon 200*a* is suitable, the first master beacon 200*a* may continuously perform the function of a gateway beacon. If it is determined that the first master beacon 200*a* is not suitable, the first master beacon 200*a* may determine another master beacon and then request the determined master beacon to perform the function of a gateway beacon. This determination may be performed by all master beacons 200. Therefore, the first master beacon 200*a* which is acting as a gateway beacon may stop the function of a gateway beacon in response to a request of another master beacon such as the second master beacon 200*b* or the third master beacon 200*c*.

Additionally, if the first master beacon 200*a* is connected with too many slave beacons or if the first master beacon 200*a* has abnormal performance, the first master beacon 200*a* may request the second master beacon 200*b* to perform the function of a gateway beacon. Therefore, the slave beacon 300 connected with the first master beacon 200*a* may be connected with the second mater beacon 200*b* instead of the first master beacon 200*a*. In this case, the third master beacon 200*c* connected with the first master beacon 200*a* may be disconnected from the first master beacon 200*a* and then operate as an independent gateway beacon or connected with the second master beacon 200*b* continuously.

As discussed hereinbefore, a suitable master beacon for a gateway beacon may be selected on the basis of determination of master beacons, and the slave beacon may be connected with the selected master beacon. Therefore, a network structure may be reestablished dynamically depending on circumstances of a beacon network.

Now, a system that supports a beacon network construction method according to the fifth embodiment of this invention will be described.

Figure 5:
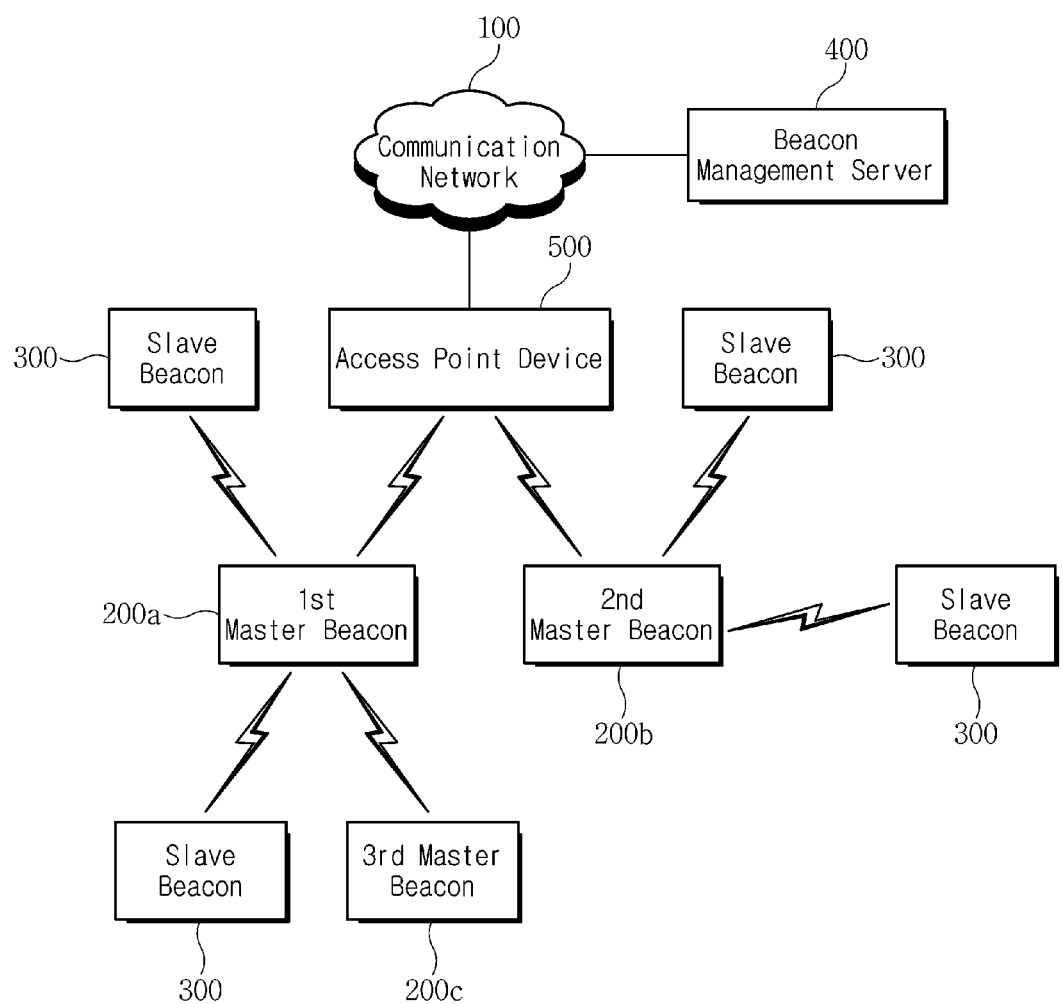
FIG. 5 is a diagram illustrating a system for supporting a beacon network construction method according to the fifth embodiment of the present invention.

FIG. 5 is a diagram illustrating a system for supporting a beacon network construction method according to the fifth embodiment of the present invention.

Referring to FIG. 5, the system according to this embodiment includes a plurality of beacon devices each of which emits a beacon signal at certain coverage. As discussed above, these beacon devices may be composed of master beacons 200 and slave beacons 300.

The slave beacon 300 may be connected under the control of the master beacon 200 so as to access the beacon management server 400. Also, the slave beacon 300 may be connected through another master beacon changed depending on system circumstances or in response to a request. On the other hand, the master beacon 200 may be connected with the communication network 100 through the AP device 500 and then transmit or receive information or data to or from the beacon management server 400 via the communication network 100.

In this beacon network system, a new master beacon that desires to access the beacon network system may be connected with the beacon management server 400 through the AP device 500 or another master beacon.

For example, let's suppose that the first and second master beacons 200*a* and 200*b* are deployed in the beacon network system and manages the slave beacon(s) 300 connected thereto. In case a new master beacon, i.e., the third master beacon 200*c*, desires to access this beacon network system, the third master beacon 200*c* may detect the first and second master beacons 200*a* and 200*b* through a scanning process within a certain range. Namely, the third master beacon 200*c* may emit a signal within a certain radius in accordance with WiFi communication protocol or any other equivalent and then receive a response from the first and second master beacons 200*a* and 200*b*. Then the third master beacon 200*c* measures the received signal strength for each received signal and compares the measured signal strength. Based on a result of comparison, the third master beacon 200*c* selects one of the first and second master beacons 200*a* and 200*b* and then performs a connection with the selected master beacon. For example, if the second master beacon 200*b* is selected, the third master beacon 200*c* may be connected with the AP device 500 through the second master beacon 200*b* and thereby access the beacon management server 400. Thereafter, the third master beacon 200*c* queries the beacon management server 400 about a Keep Alive message arrival rate for each of the first and second master beacons 200*a* and 200*b*.

The beacon management server 400 periodically receives Keep Alive messages from the first and second master beacons 200*a* and 200*b* connected thereto and checks an arrival rate therefor. Also, in response to a query of the third master beacon 200c, the beacon management server 400 transmits the arrival rate for each master beacon to the third master beacon 200c.

If the first master beacon 200a has a better Keep Alive message arrival rate, the third master beacon 200c may perform a procedure of releasing a connection with the second master beacon 200b and instead establishing a connection with the first master beacon 200a. At this time, the third master beacon 200c selects the optimal master beacon by combining the arrival rate and the received signal strength rather than by merely considering the arrival rate. Also, the third master beacon 200c may periodically check the arrival rate and thereby select a master beacon to be connected.

Meanwhile, if the signal strength received from the first and second master beacons 200a and 200b is smaller than a given value, or if it is determined that a direct connection with the AP device 500 is more effective, the third master beacon 200c may be directly connected with the AP device 500 to access the beacon management server 400.

As discussed hereinbefore, a new master beacon that desires to access the beacon network system selects the optimal master beacon in view of the received signal strength of signals received from other master beacons and the arrival rate of Keep Alive messages at the beacon management server and then is connected with the selected master beacon. It is therefore possible to construct a network based on more effectively distributed connections.

This invention is not limited to only the above case in which a new master beacon is connected with the beacon network system. Any already connected master beacon can also check the received signal strength and the Keep Alive message arrival rate and then select another master beacon.

Hereinbefore, several embodiments about the system for supporting the beacon network construction method are described.

Now, the terminal device 30, one of elements that constitute the system for supporting the beacon network construction method, will be described in detail.

Figure 6:
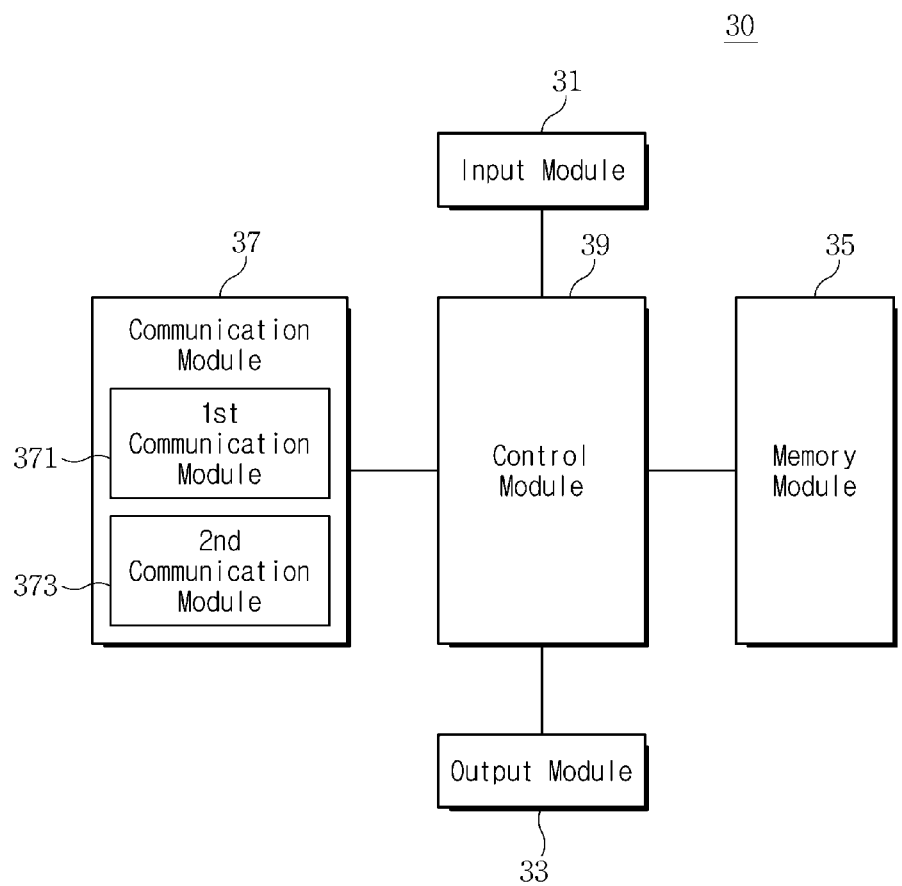
FIG. 6 is a block diagram illustrating the configuration of a terminal device according to an embodiment of the present invention.
Figure 7:
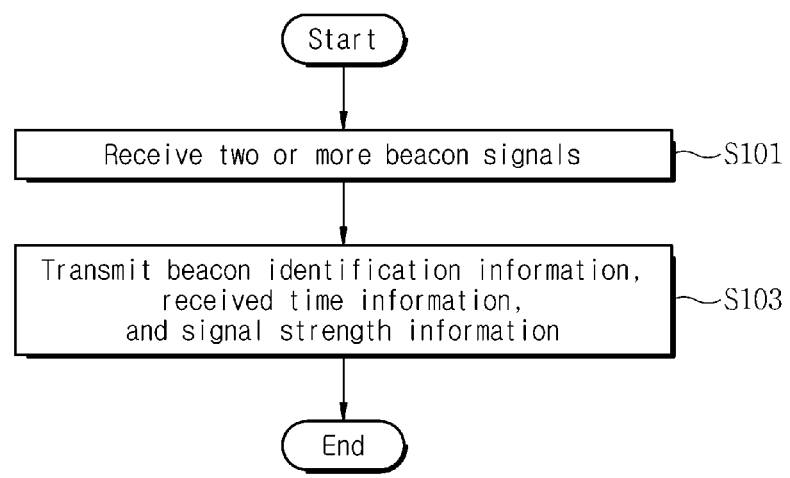
FIG. 7 is a flow diagram illustrating an operating method of a terminal device according to an embodiment of the present invention.

FIG. 6 is a block diagram illustrating the configuration of a terminal device 30 according to an embodiment of the present invention, and FIG. 7 is a flow diagram illustrating an operating method of a terminal device 30 according to an embodiment of the present invention.

Referring to FIG. 6, the terminal device 30 may include an input module 31, an output module 33, a memory module 35, a communication module 37, and a control module 39.

The input module 31 is configured to receive user's manipulation for entering various kinds of information and setting or controlling various functions of the terminal device 30, to create a corresponding input signal, and to deliver the input signal to the control module 39. The input module 31 may include a keypad and/or a touch pad. The input module 31 formed of a touch panel may be integrated with the output module 33 formed of a display panel to constitute a touch screen. The input module 31 may use various input mechanisms such as a keyboard, a mouse, a joystick, a jog wheel, a touch-sensitive unit, a gesture or image detection unit, a voice recognition unit, and the like. Additionally, the input module 31 detects input information entered by the user and delivers it to the control module 39.

The output module 33 is configured to display information about the state and result of operations generated during the execution of functions of the terminal device 30. Also, the output module 33 may display a menu of the terminal device 30 and user data entered by the user. The output module 33 may be formed of LCD (Liquid Crystal Display), TFT-LCD (Thin Film Transistor LCD), LED (Light Emitting Diode), OLED (Organic LED), AMOLED (Active Matrix OLED), retina display, flexible display, 3-dimensional display, or the like. In case the output module 33 is formed of a touch screen, the output module 33 may perform the whole or parts of functions of the input module 31.

The memory module 35 is a device for storing data and includes a main memory unit and an auxiliary memory unit. Further, the memory module 35 stores a program required for the operation of the terminal device 30. The memory module 35 may include mainly a program region and a data region. When any function is activated in response to a user's request, the terminal device 30 executes a relevant application and offers a particular function under the control of the control module 39.

The communication module 37 is configured to transmit or receive data to or from the beacon management server 400 through the communication network 100, and to receive signals emitted periodically by a plurality of beacon devices.

The communication module 37 may include an RF transmitter which up-converts the frequency of an outgoing signal and then amplifies the signal, an RF receiver which amplifies with low-noise an incoming signal and down-converts the frequency of the signal, a data processor for processing a communication protocol based on a specific communication scheme, and the like. The communication module 37 may include at least one wireless communication module (not shown) and/or at least one wired communication module (not shown). The wireless communication module may be configured for transmission and reception based on a particular wireless communication scheme. In case of using wireless communication, the terminal device 30 may transmit or receive data to or from the beacon management server 400 by using one of a wireless network communication module, a WLAN communication module, and a WPAN communication module.

The communication module 37 includes the first communication module 371 and the second communication module 373.

The first communication module 371 receives a signal transmitted from each of beacon devices. The first communication module 371 may perform PAN-type communication including Bluetooth.

The second communication module 373 communicates with the beacon management server 400 through the communication network 100. The second communication module 373 may use wireless communication technique such as, but not limited to, WLAN (Wireless Local Access Network), Wi-Fi, Wibro, Wimax, HSDPA (High Speed Downlink Packet Access), or the like.

The control module 39 may be a processor for triggering and operating each element and an operation system of the terminal device 30.

For example, the control module 39 may control the communication module 37 to transmit a signal entered through the input module 31 to the beacon management server 400, may control the output module 33 to output a beacon signal received through the communication module 37 or to output information received from the beacon management server 400, and may control the memory module 35 to store such information and/or data.

Particularly, when a beacon signal is received from any beacon device 20, the control module 39 creates received time information about the received beacon signal and received signal strength information about the received beacon signal, and then transmits the created information to the beacon management server 400 together with beacon identification information contained in the received beacon signal.

FIG. 7 shows the operation of the terminal device 30. Referring to FIG. 7, the terminal device 30 receives a plurality of beacon signals from a plurality of beacon devices 20 (step S101). Then the terminal device 30 creates the received time information and the received signal strength information about each of the received beacon signals, and transmits the created information to the beacon management server 400 together with beacon identification information contained in the received beacon signal (step S103).

Hereinbefore, the configuration and operation of the terminal device 30 are described.

Now, the beacon device 20 according to an embodiment of this invention will be described with reference to FIGS. 8 and 9.

As discussed above, the beacon device 20 may operate as a master beacon or a slave beacon. FIG. 8 focuses on the operation of the master beacon, whereas FIG. 9 focuses on the operation of the slave beacon.

Figure 8:
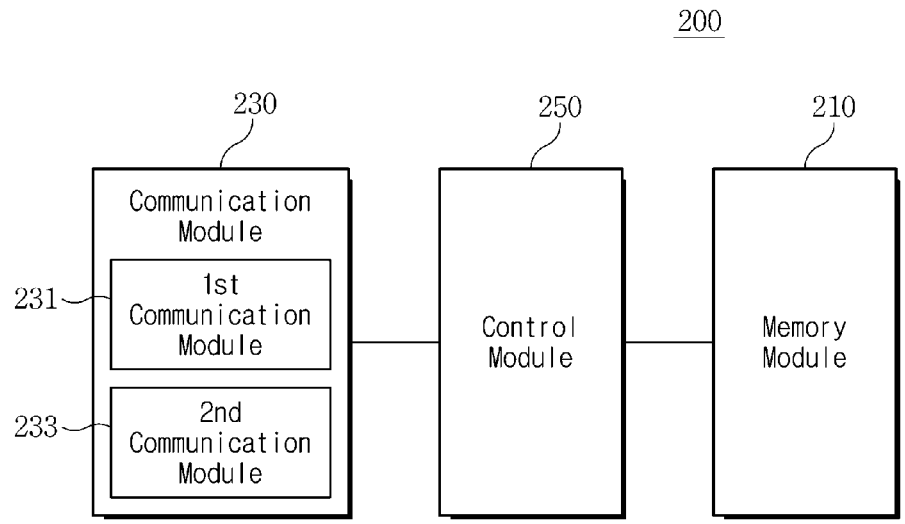
FIG. 8 is a block diagram illustrating the configuration of a master beacon according to an embodiment of the present invention.

FIG. 8 is a block diagram illustrating the configuration of a master beacon 200 according to an embodiment of the present invention.

Referring to FIG. 8, the master beacon 200 may include a memory module 210, a communication module 230, and a control module 250.

The memory module 210 is a device for storing data and includes a main memory unit and an auxiliary memory unit. Further, the memory module 210 stores a program required for the operation of the master beacon 200. The memory module 210 may include mainly a program region and a data region. When any function is activated in response to a user's request, the master beacon 200 executes a relevant application and offers a particular function under the control of the control module 250.

The communication module 230 is configured to transmit or receive data to or from the beacon management server 400 through the communication network 100, and to periodically or aperiodically transmit or receive a signal and data to or from other beacon devices 20.

The communication module 230 may include an RF transmitter which up-converts the frequency of an outgoing signal and then amplifies the signal, an RF receiver which amplifies with low-noise an incoming signal and down-converts the frequency of the signal, a data processor for processing a communication protocol based on a specific communication scheme, and the like. The communication module 230 may include at least one wireless communication module (not shown) and/or at least one wired communication module (not shown). The wireless communication module may be configured for transmission and reception based on a particular wireless communication scheme. In case of using wireless communication, the master beacon 200 may transmit or receive data to or from the beacon management server 400 by using one of a wireless network communication module, a WLAN communication module, and a WPAN communication module.

The communication module 230 includes the first communication module 231 and the second communication module 233.

The first communication module 231 transmits or receives a signal and data to or from other beacon devices 20 so as to, e.g., maintain a wireless connection. The first communication module 231 may perform PAN-type communication including Bluetooth.

The second communication module 233 communicates with the beacon management server 400 through the communication network 100. The second communication module 233 may use wireless communication technique such as, but not limited to, WLAN (Wireless Local Access Network), Wi-Fi, Wibro, Wimax, HSDPA (High Speed Downlink Packet Access), or the like. Alternatively or additionally, depending on system types, the second communication module 233 may use wired communication technique such as Ethernet, xDSL (ADSL, VDSL), HFC (Hybrid Fiber Coaxial cable), FTTC (Fiber To The Curb), FTTH (Fiber To The Home), or the like.

Although it is desirable that the master beacon 200 has the first and second communication modules 231 and 233, the master beacon 200 may have only a single communication module for communication with the beacon management server 400 in case of no communication with other beacon devices.

The control module 250 may be a processor for triggering and operating each element and an operation system of the master beacon 200.

The control module 250 controls the whole operation of the master beacon 200. Particularly, the control module 250 may control at least one slave beacon 300 through a connection with the slave beacon 300 and also control transmission and reception of information to and from at least one neighboring another master beacon 200 and the beacon management server 400 through corresponding connections. In this state, the control module 250 may check a signal recognition rate measured for a signal emitted from at least one slave beacon 300 connected for a certain time, check whether to operate as a gateway beacon capable of a connection with another master beacon, check whether there is a need to change an operating mode to a master beacon or a slave beacon, or check received signal strength of a beacon signal emitted to the terminal device 30 and a message arrival rate of messages delivered to the beacon management server 400. Further, using information about the above check, the control module 250 may determine respective connections with the neighboring another master beacon 200, the slave beacon 300, and the beacon management server 400, and then construct a beacon network or dynamically change the constructed beacon network.

More detailed operations of the control module 250 in the master beacon 200 will be described later.

Now, the beacon device 20 that operates as the slave beacon 300 will be described with reference to FIG. 9.

Figure 9:
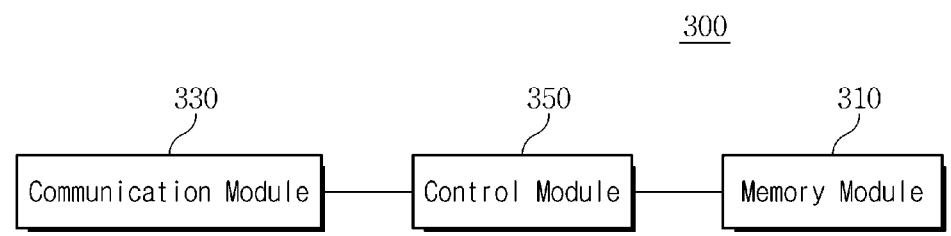
FIG. 9 is a block diagram illustrating the configuration of a slave beacon according to an embodiment of the present invention.

FIG. 9 is a block diagram illustrating the configuration of a slave beacon 300 according to an embodiment of the present invention.

Referring to FIG. 9, the slave beacon 300 may include a memory module 310, a communication module 330, and a control module 350, like the master beacon 200. However, contrary to the master beacon 200, the slave beacon 300 is incapable of a connection with the beacon management server 400. Namely, the slave beacon 300 may have no hardware module for communication with the beacon management server 400 and also have no software state allowing communication with the beacon management server 400.

The memory module 310 is a device for storing data and includes a main memory unit and an auxiliary memory unit. Further, the memory module 310 stores a program required for the operation of the slave beacon 300. The memory module 310 may include mainly a program region and a data region. When any function is activated in response to a user's request, the slave beacon 300 executes a relevant application and offers a particular function under the control of the control module 350.

Contrary to the master beacon 200, the communication module 330 of the slave beacon 300 performs only a function to periodically or aperiodically transmit or receive a signal and data to or from the master beacon 200 so as to, e.g., maintain a wireless connection. Although being able to transmit or receive information to or from the beacon management server 400 through the master beacon 200, the slave beacon 300 cannot directly transmit or receive information to or from the beacon management server 400. As discussed above, the communication module 330 may perform PAN-type communication including Bluetooth.

The control module 350 may be a processor for triggering and operating each element and an operation system of the slave beacon 300.

The control module 350 controls the whole operation of the slave beacon 300. Particularly, the control module 350 may perform predetermined operations under the control of the master beacon 200. If the slave beacon 300 is a beacon device capable of operating in a master beacon mode but currently operating in a slave beacon mode, the control module 350 may determine whether to change from the slave beacon mode to the master beacon mode.

More detailed operations of the control module 350 in the slave beacon 300 will be described later.

Now, the beacon management server 400 will be described with reference to FIG. 10.

Figure 10:
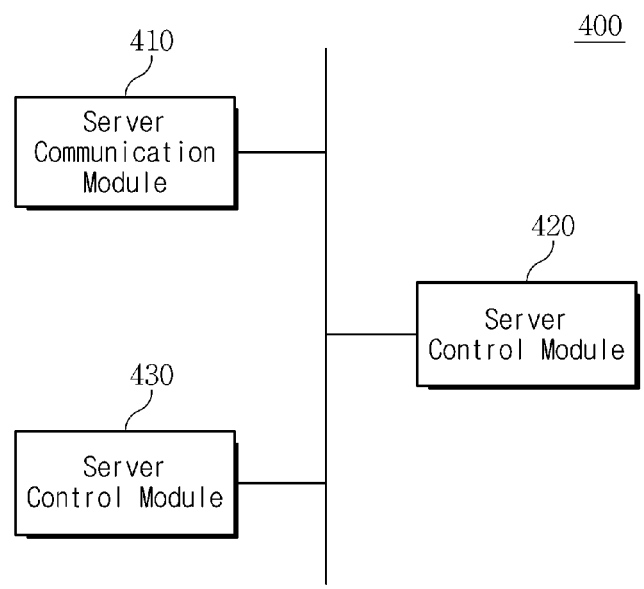
FIG. 10 is a block diagram illustrating the configuration of a beacon management server according to an embodiment of the present invention.

FIG. 10 is a block diagram illustrating the configuration of a beacon management server 400 according to an embodiment of the present invention.

Referring to FIG. 10, the beacon management server 400 may include a server communication module 410, a server control module 420, and a server memory module 430.

The server communication module 410 is configured to transmit or receive data to or from the beacon device 20 and the terminal device 30 through the communication network 100. The server communication module 410 may include an RF transmitter which up-converts the frequency of an outgoing signal and then amplifies the signal, an RF receiver which amplifies with low-noise an incoming signal and down-converts the frequency of the signal, a data processor for processing a communication protocol based on a specific communication scheme, and the like. The server communication module 410 may include at least one wireless communication module (not shown) and/or at least one wired communication module (not shown).

The wireless communication module may be configured for transmission and reception based on a particular wireless communication scheme. In case of using wireless communication, the beacon management server 400 may transmit or receive data to or from the master beacon 200 and the terminal device 30 by using one of a wireless network communication module, a WLAN communication module, and a WPAN communication module.

The server communication module 430 may use wireless communication technique such as, but not limited to, WLAN (Wireless Local Access Network), Wi-Fi, Wibro, Wimax, HSDPA (High Speed Downlink Packet Access), or the like. Alternatively or additionally, depending on system types, the server communication module 430 may use wired communication technique such as Ethernet, xDSL (ADSL, VDSL), HFC (Hybrid Fiber Coaxial cable), FTTC (Fiber To The Curb), FTTH (Fiber To The Home), or the like.

The server control module 420 may be a processor for triggering and operating each element and an operation system of the beacon management server 400. The server control module 420 controls the whole operation of the beacon management server 400. Particularly, the server control module 420 may collect, from the terminal device 30, identification information and received time information regarding a beacon signal received by the terminal device 30, compare the identification information and the received time information regarding the respective collected beacon signals, and calculate a difference between received times of beacon signals emitted by the beacon devices 20. If the calculated time difference is within a predetermined time interval, the server control module 420 may determine that the beacon devices corresponding to beacon identification information contained in the beacon signals are connectable with each other.

Therefore, beacon signals used for a calculation of a difference in received time should be different from each other in beacon identification information. This means that such beacon signals should be emitted from different beacon devices.

Additionally, the server control module 420 may check network connectivity information of the beacon device 20, based on the beacon identification information through data contained in a beacon database. If the beacon devices 20 emitting such beacon signals belong to different beacon networks, the server control module 420 may determine that these beacon devices are connectable. If the beacon devices belong to the same beacon network, the server control module 420 may determine that these beacon devices are not connectable. Namely, if certain beacon devices belong to the same beacon network, these beacon devices have been already connected with each other directly or indirectly and thus may require no further connection.

By the way, some beacon devices may be indirectly connected with each other even though belonging to the same beacon network. In this case, there may be a need for a direct connection of such beacon devices. Then the server control module 420 may calculate the hop number of the beacon devices and, if the calculated hop number is greater than a given value, determine that the beacon devices are connectable.

Meanwhile, the server control module 420 may determine connectability, based on the received signal strength information of a beacon signal instead of using the received time information of a beacon signal.

Specifically, the server control module 420 may estimate a distance between the beacon devices, based on the received signal strength information of a beacon signal, and if the estimated distance is within a given range, determine that the beacon devices are connectable with each other.

Additionally, the server control module 420 may analyze the signal strength information collected for a certain time with regard to the beacon devices, extract a signal strength variation pattern of the beacon devices due to the movement of the terminal device, and estimate a distance between the beacon devices by considering the signal strength variation pattern. In this case, the server control module 420 should compare the identification information with two or more pieces of signal strength information collected for a certain time, so that a one-to-many mapping relation is required between one beacon device and the signal strength information.

Namely, in order to estimate a distance between the first and second beacon devices and then determine connectability thereof, the signal strength information about two or more beacon signals emitted by the first beacon device and the signal strength information about two or more beacon signals emitted by the second beacon device are required together. In other words, for distance estimation, four or more pieces of signal strength information are required. Further, at least two pieces of signal strength information should be paired and then mapped to the same identification information.

For example, if the signal strength of a signal received first from the first beacon device by the terminal device is greater than that of the next received signal, this means that the terminal device is receding from the first beacon device. If the signal strength of a signal received first from the second beacon device by the terminal device is smaller than that of the next received signal, this means that the terminal device is approaching the second beacon device. Therefore, from such information, it is possible to estimate a variation in distance between the terminal device and each beacon device and further estimate a distance between the beacon devices.

Also, if the estimated distance between beacon devices is within a given value, it may be determined that the beacon devices are connectable with each other.

Additionally, for more exact estimation of a distance between the beacon devices, location information about the terminal device may be further collected and considered.

The calculation or estimation of a distance between the beacon devices does not always rely on the signal strength information. Such a distance may also be calculated or estimated using location information about the beacon devices stored in a beacon database.

In addition, connectability of beacon devices may be determined using both the received time information and the received signal strength information of beacon signals.

Namely, if the calculated time interval is within a given value, and if the estimated distance is within a given value, it may be determined that the beacon devices are connectable. In other words, the beacon devices may be determined to be connectable when both conditions are satisfied.

When it is determined that two or more of the beacon devices are connectable with each other, the server control module 420 may increase the strength of emission power of at least one of the connectable beacon devices so as to connect the connectable beacon devices.

Additionally, the server control module 420 may calculate a location for installing a new beacon device for a connection of the beacon devices and then send information about the calculated location to a beacon device manager.

The installation location may be calculated on the basis of location information about the beacon devices stored in the beacon database, the calculated distance value, and/or the calculated time interval value.

The method for connecting the beacon devices may be selected from among the above-discussed two methods, based on usage environment or installation environments of the beacon devices. The server control module 420 may define the maximum emission power critical value in view of various environments of the beacon devices. If the connection of the beacon devices is allowed with emission power smaller than the critical value, the server control module 420 may increase the emission power to connect the beacon devices. However, if the connection of the beacon devices requires emission power greater than the critical value, the server control module 420 may calculate an installation location of a new beacon device rather than increasing the emission power.

Of course, the above methods may be used together. Namely, it is possible to use a new beacon device between the connectable beacon devices while increasing somewhat the emission power.

For example, if a disconnection request message that requires a disconnection from the slave beacon is received from the first master beacon, the server control module 420 may scan an alternative master beacon for managing the slave beacon by utilizing information stored in the server memory module 430.

Additionally, the server control module 420 may receive a Keep Alive message from each of the master beacons, check an arrival rate of the Keep Alive message, and store the arrival rate to correspond to the identification information of each master beacon. In this disclosure, the Keep Alive message refers to a message which is periodically transmitted to check a normal operation of a link between two devices or to prevent a disconnection of a link. The server control module 420 checks an arrival rate of the Keep Alive message received from each master beacon and then stores the arrival rate together with the identification information of each master beacon. Then if a query about a Keep Alive message arrival rate of a specific master beacon is received from another master beacon, the server control module 420 may retrieve the stored arrival rate and then offer a response to the query-sending master beacon.

If the arrival rate of the Keep Alive message received from a specific master beacon is lowered under a predetermined value, the server control module 420 may determine that any failure occurs at the specific master beacon. Then the server control module 420 may control the slave beacon connected with the specific master beacon to be connected with another master beacon.

Meanwhile, the server memory module 430 is a device for storing data and includes a main memory unit and an auxiliary memory unit. Further, the server memory module 430 stores a program required for the operation of the beacon management server 400. The server memory module 430 may include mainly a program region and a data region. When any function is activated in response to a user's request, the beacon management server 400 executes a relevant application and offers a particular function under the control of the server control module 420.

Particularly, the server memory module 430 may store beacon network connection information, installation location information about each master beacon and each slave beacon, and the like. The beacon network connection information may include information about the slave beacon managed by each master beacon, information about a connection relation between the master beacons and the slave beacons, signal emission power information about the master beacons and the slave beacons, and the like.

Hereinbefore, the respective apparatuses, i.e., several devices and server, constituting the system according various embodiments are described.

Meanwhile, a memory module equipped in each apparatus disclosed herein is configured to store information in such an apparatus. In various embodiments, the memory module is a computer-readable storage medium. In one embodiment, the memory module may be a volatile memory. In another embodiment, the memory module may be a nonvolatile memory. In some embodiments, the memory module may be a hard disk, an optical disk, and/or any other mass storage device.

In addition, the term "module" used herein may refer to a component or device which is formed of software, hardware, or combination thereof, and performs certain tasks. A module may be configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Although this description and drawings illustrate exemplary device elements, the subject matters and functional operations disclosed herein may be implemented by different type digital electronic circuits or implemented by computer software, firmware or hardware including a structure disclosed herein and structural equivalent thereof, or any combination thereof. The subject matters disclosed herein may be implemented by at least one computer program product, namely at least one module regarding computer program commands encoded on a program storage medium so as to control the operation of a device according to this invention or allow execution thereby. A computer-readable medium may be a machine-readable storage device, a machine-readable storage board, a memory device, a machine-readable composition of material affecting wave-type signaling, or a combination thereof.

Hereinafter, various methods for constructing a beacon network will be described through five embodiments.

The first embodiment is implemented by the beacon management server 400 and will focus on a process of determining the connectability of beacon devices 20 disconnected from the beacon management server 400 and then performing a connection based on a result of determination.

The second to fifth embodiments are implemented by the beacon device 20, especially the master beacon 200. The second embodiment will focus on a process of checking a signal recognition rate measured for a signal emitted by at least one slave beacon 300 and then controlling a connection with the slave beacon 300. The third embodiment will focus on a process of checking state information and then determining whether to operate as a gateway beacon being connectable with other master beacons. The fourth embodiment will focus on a process of checking a need to change an operating mode and then changing a beacon network. The fifth embodiment will focus a process of checking received signal strength of a beacon signal emitted to the terminal device 30 and a message arrival rate of a message delivered to the beacon management server 400 and then changing a beacon network.

At the outset, a method for constructing a beacon network in the first embodiment will be described with reference to FIGS. 11 to 15.

FIGS. 11 to 15 are diagrams illustrating a beacon network construction method according to the first embodiment of the present invention.

Figure 11:
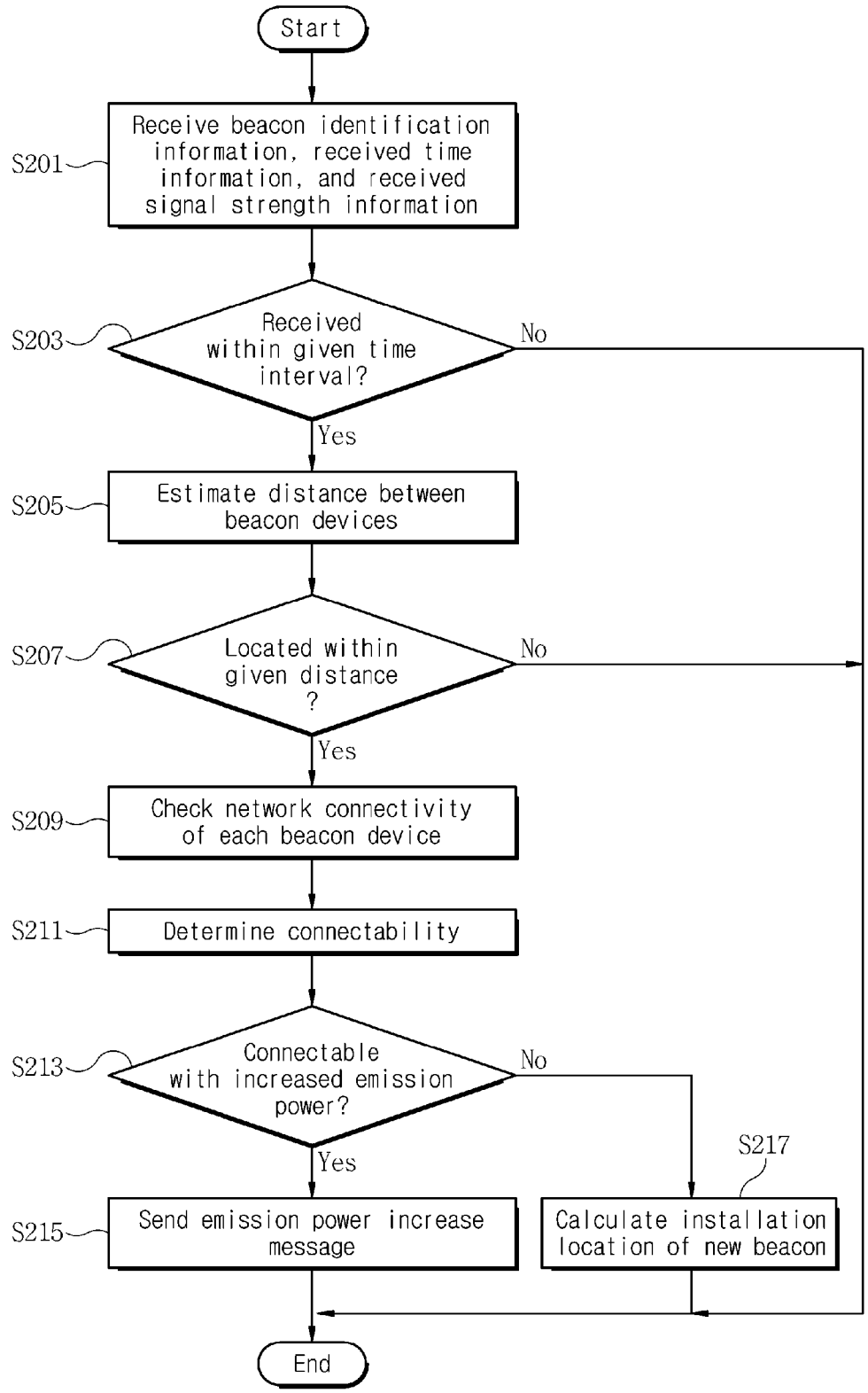
FIGS. 11 to 15 are diagrams illustrating a beacon network construction method according to the first embodiment of the present invention.
Figure 12:
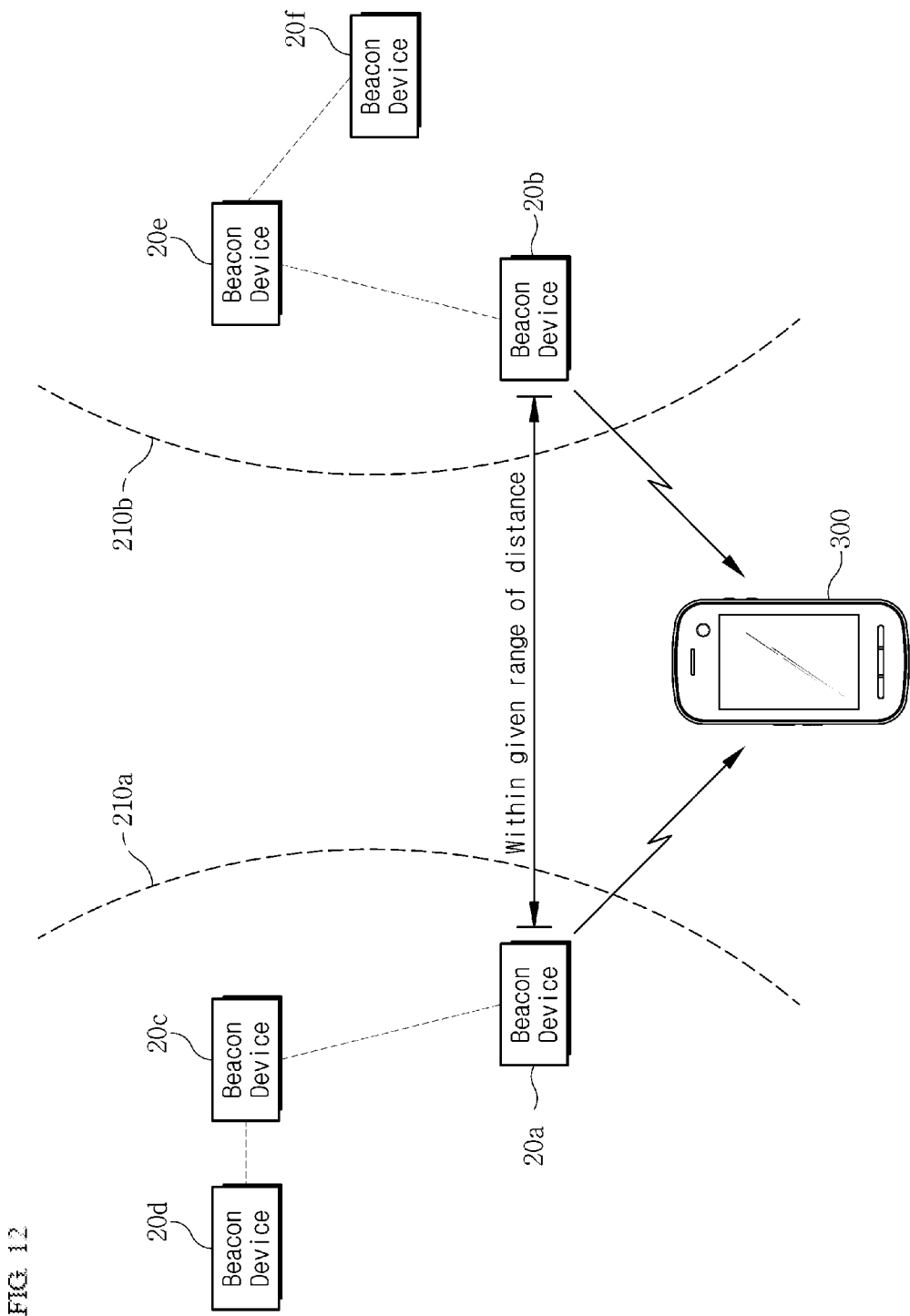
Figure 13:
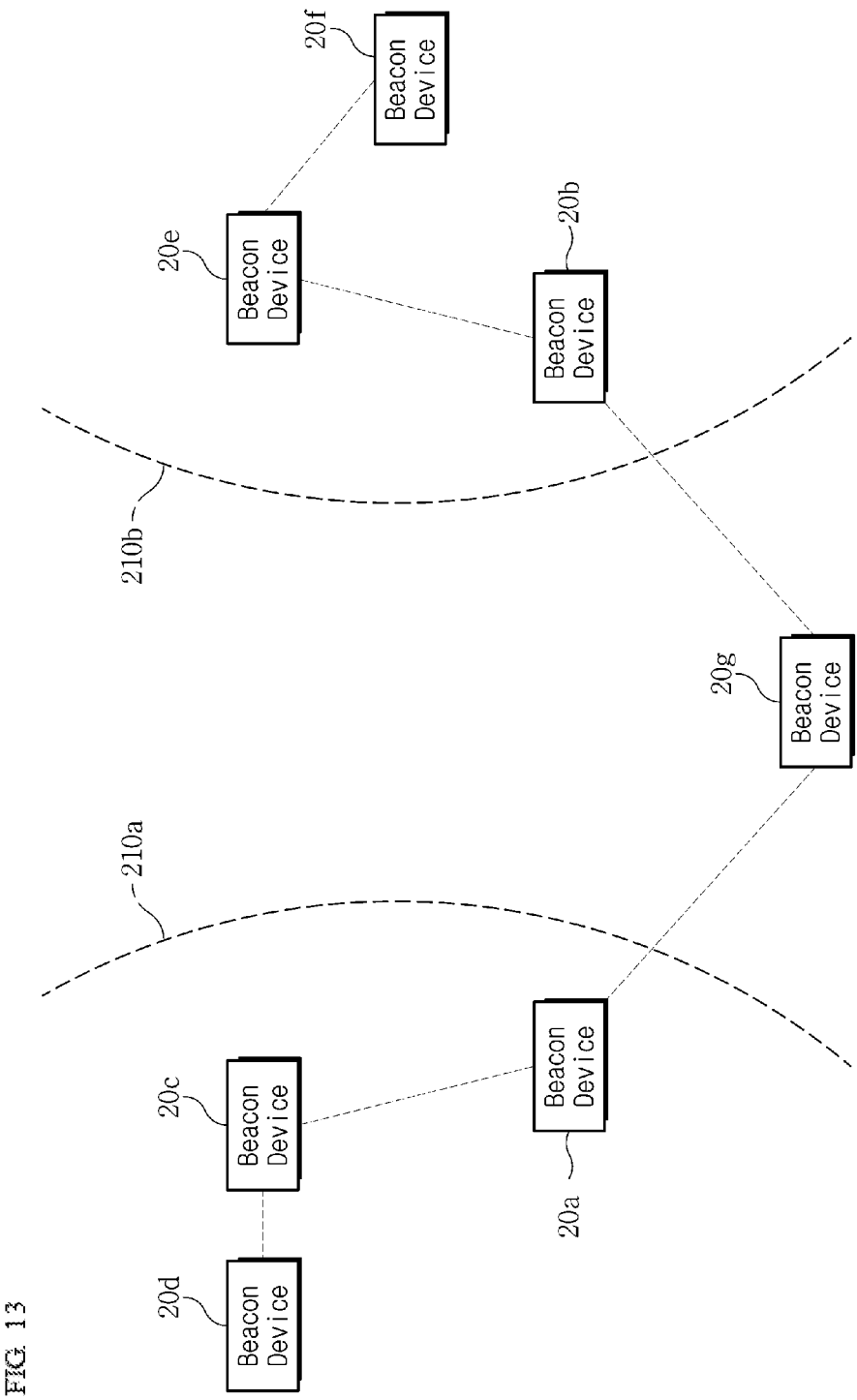
Figure 14:
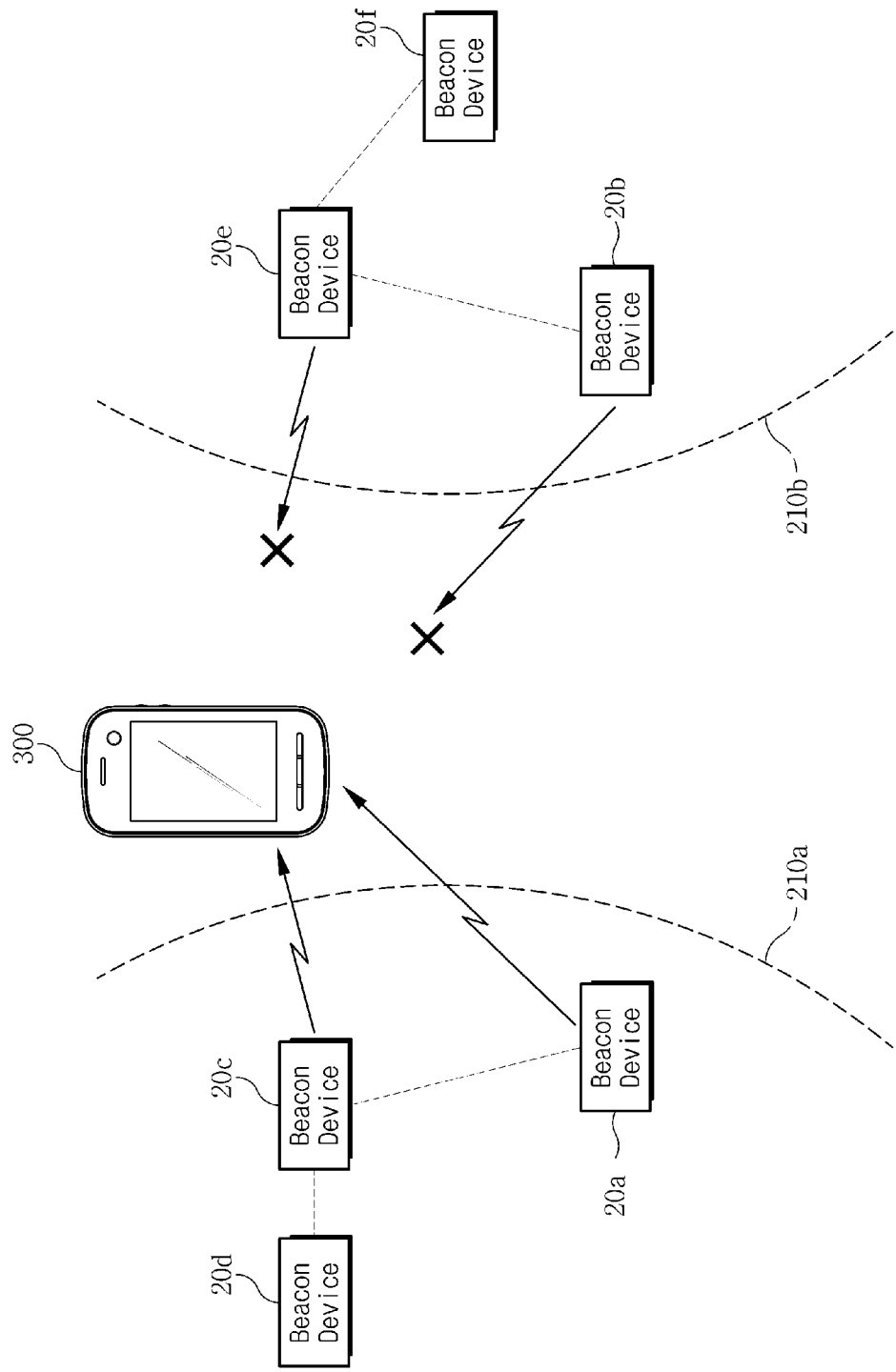
Figure 15:
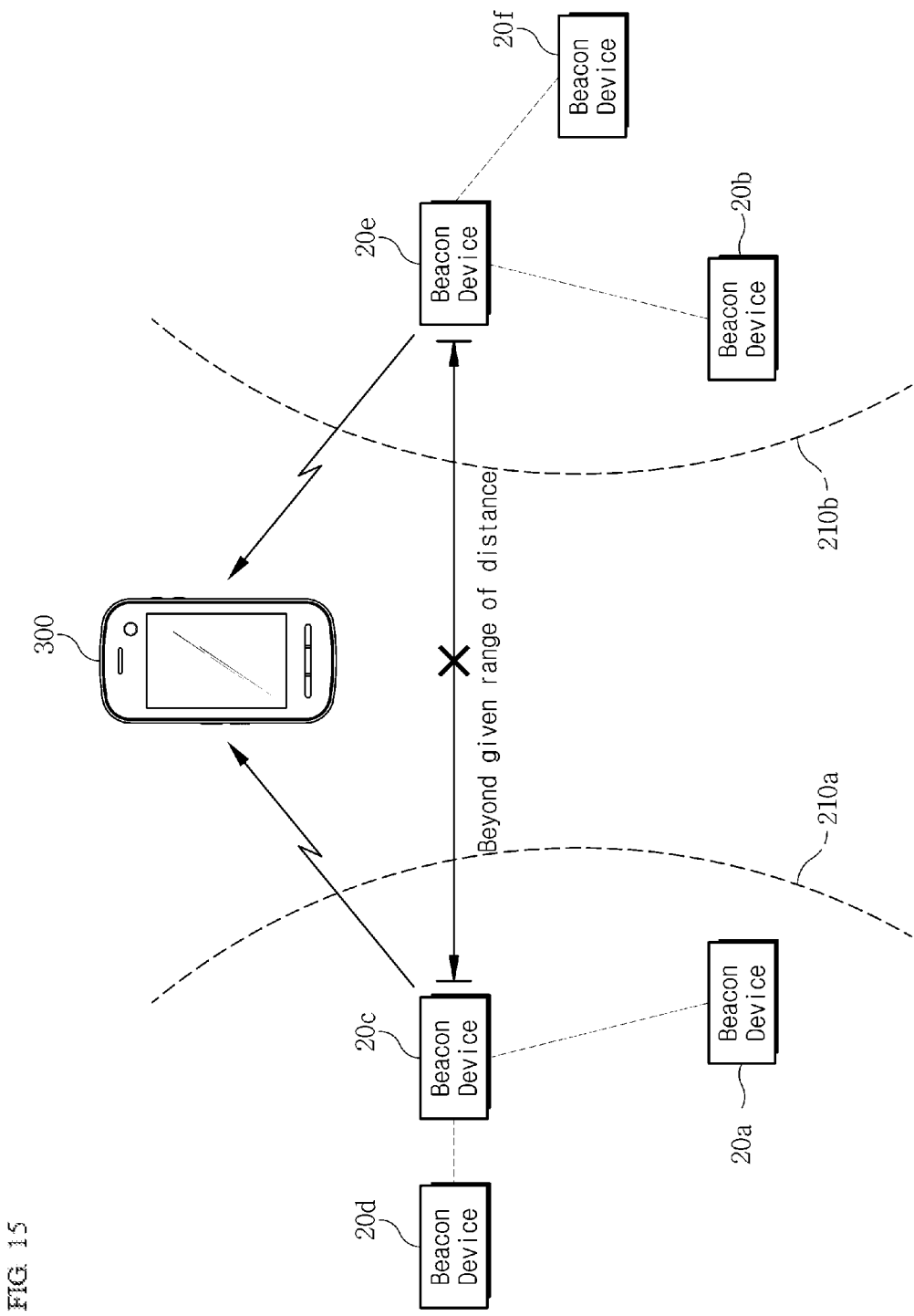

Specifically, FIG. 11 is a flow diagram of the beacon network construction method according to the first embodiment. FIGS. 12 and 13 depict examples in case a beacon device is connectable in the first embodiment, whereas FIGS. 14 and 15 depict examples in case a beacon device is not connectable in the first embodiment.

Referring to FIG. 11, the beacon management server 400 receives, from the terminal device 30, beacon identification information, received time information, and received signal strength information in connection with beacon signals received from the beacon devices 20 by the terminal device 30 (step S201).

Then, based on the received time information, the beacon management server 400 determines whether a time interval of received beacon signals is within a given value (step S203). If so, the beacon management server 400 may determine that the beacon devices 20 are connectable with each other.

By the way, the received time information used for determining such a time interval should be obtained from different beacon signals, having different pieces of identification information, which are emitted from different beacon devices 20, respectively.

For more exact measurement, the beacon management server 400 may estimate a distance between the beacon devices 20, based on the signal strength information received from the beacon devices 20 (step S205). For example, using the signal strength information about two or more beacon signals emitted from one beacon device and about two or more beacon signals emitted from another beacon device, the beacon management server 400 may estimate a distance between two beacon devices. Then the beacon management server 400 may determine whether the estimated distance is within a predetermined value (step S207). If so, the beacon management server 400 may determine that the beacon devices 20 are connectable.

In this case, the beacon management server 400 may extract a pattern of variation in signal strength with regard to the beacon devices 20, caused by a movement of the terminal device 30, and then estimate a distance between the beacon devices 20 by considering the extracted signal strength variation pattern.

Also, the beacon management server 400 may collect location information of the terminal device 30 and further consider this information so as to enhance the accuracy of distance estimation.

Meanwhile, the above-discussed time-based technique and distance-based technique may be used selectively and independently. Namely, the connectability may be based on only one of the time-based technique and the distance-based technique as well as based on both.

Additionally, the beacon management server 400 may check information about beacon network connectivity of each beacon device 20, based on the beacon identification information contained in the beacon signal (step S209).

If the beacon devices 20 belong to the same wireless network, these beacon devices 20 have been already connected with each other directly or indirectly. Thus, in this case, there is no need to determine connectability. If the beacon devices 20 belong to different networks, the beacon management server 400 may determine that these beacon devices 20 are connectable with each other (step S211).

However, even though the beacon devices 20 belong to the same network, the beacon management server 400 may determine, if necessary, that these beacon devices 20 are connectable with each other.

If it is determined that the beacon devices 20 are connectable with each other, the beacon management server 400 may further determine whether it is possible to connect the beacon devices 20 by increasing signal emission power of at least one of the beacon devices 20 (step S213).

For example, the beacon management server 400 may define the maximum emission power critical value in view of an installation environment of the beacon device and the performance of the beacon device. If it is possible to connect the beacon devices by increasing emission power so as not to exceed the critical value, the beacon management server 400 may transmit an emission power increase message to each beacon device 20 so as to increase the emission power of the beacon devices 20 (step S215). However, if the connection of the beacon devices requires emission power greater than the critical value, the beacon management server 400 may calculate an installation location of a new beacon device rather than increasing the emission power (step S217) and then inform this to a beacon installation manager or the like.

The installation location of a new beacon device may be calculated using at least one of a time interval of received beacon signals, a distance between the beacon devices 20, and a location of each beacon device 20.

Also, the above technique for increasing the emission power of the beacon devices 20 and the above technique for calculating a location of a new beacon device may be used together.

Namely, the beacon management server 400 may calculate an installation location of a new beacon device while increasing somewhat the emission power of at least one of the beacon devices 20, depending on the installation location of the new beacon device and surrounding environments.

Hereinafter, an embodiment of a method for connecting beacon devices will be described.

Referring to FIG. 12, beacon devices 20*a*, 20*c* and 20*d* form one wireless mesh network having a specific emission range 21*a*, and similarly beacon devices 20*b*, 20*e* and 20*f* form another wireless mesh network having a specific emission range 21*b*.

If the terminal device 30 moving between both mesh networks receives beacon signals from the beacon devices 20*a* and 20*b*, the terminal device 30 may send, to the beacon management server 400, identification information about the beacon devices 20*a* and 20*b*, received time information created by the terminal device 30 with regard to the received beacon signals, and received signal strength information created also by the terminal 30 with regard to the received beacon signals.

The beacon management server 400 that receives the above information may determine that the beacon devices 20*a* and 20*b* are connectable with each other if a received time difference between the beacon signals is within a predetermined value.

Also, the beacon management server 400 may estimate a distance between the beacon devices 20*a* and 20*b*, based on the received signal strength information about two or more beacon signals received respectively from the beacon devices 20*a* and 20*b*. If the estimated distance is within a predetermined value, the beacon management server 400 may determine that the beacon devices 20*a* and 20*b* are connectable with each other.

In this case, the beacon management server 400 may extract a pattern of variation in signal strength caused by the movement of the terminal device 30, and then estimate a distance between the beacon devices 20*a* and 20*b* by considering the extracted pattern. In addition, the beacon management server 400 may further use the location information of the terminal device 30 so as to enhance the accuracy of distance estimation.

Meanwhile, the above both techniques may be used together to determine connectability of the beacon devices 20*a* and 20*b*.

Additionally, based on the received identification information, the beacon management server 400 may know whether the beacon devices 20*a* and 20*b* belong to the same wireless mesh network. In FIG. 12, the beacon management server 400 may determine that the beacon devices 20*a* and 20*b* belonging to different networks are connectable with each other.

Then the beacon management server 400 may select a scheme to connect the beacon devices 20*a* and 20*b*. For example, it is possible to connect the beacon devices 20*a* and 20*b* by increasing the emission power of at least one of the beacon devices 20*a* and 20*b*.

However, if an increase of emission power is not suitable in view of communication environments, or if it is impossible to connect the beacon devices 20*a* and 20*b* through an increase of emission power, the beacon management server 400 may install a new beacon device 20*g* between the beacon devices 20*a* and 20*b* as shown in FIG. 13 so as to connect the beacon devices 20*a* and 20*b*.

Also, the beacon management server 400 may use the above two techniques, namely, install the new beacon device 20*g* while increasing the emission power of at least one of the beacon devices 20*a* and 20*b*.

Hereinafter, a case where beacon devices are not connectable with each other will be described with reference to FIGS. 14 and 15.

As shown in FIG. 14, the terminal device 30 moving between two wireless mesh networks receives beacon signals from the beacon devices 20*a* and 20*c* belonging to one network and fails to receive beacon signals from the beacon devices 20*b*, 20*e* and 20*f* belonging to another network. In this case, even though a received time interval of beacon signals received from the beacon devices 20*a* and 20*c* is within a given value and also a distance between the beacon device 20*a* and 20*c* is within a given value, the beacon management server 400 may determine that the beacon devices 20*a* and 20*c* are not connectable.

Although, if necessary, it is possible to determine that some beacon devices residing in the same network are connectable, the beacon management server 400 may not determine connectability of the beacon devices 20*a* and 20*c* since they have been already connected with each other.

Meanwhile, FIG. 15 shows another case in which the terminal device 30 receives beacon signals from the beacon devices 20*c* and 20*e* belonging to different networks. However, in this case, a distance between the beacon devices 20*c* and 20*e* exceeds a predetermined value. Therefore, the beacon management server 400 may determine that these beacon devices 20*c* and 20*e* are not connectable.

Described hereinbefore is the beacon network construction method according to the first embodiment.

Hereinafter, the beacon network construction method according to the second embodiment will be described with reference to FIGS. 16 to 21.

FIGS. 16 to 21 are diagrams illustrating a beacon network construction method according to the second embodiment of the present invention.

Figure 16:
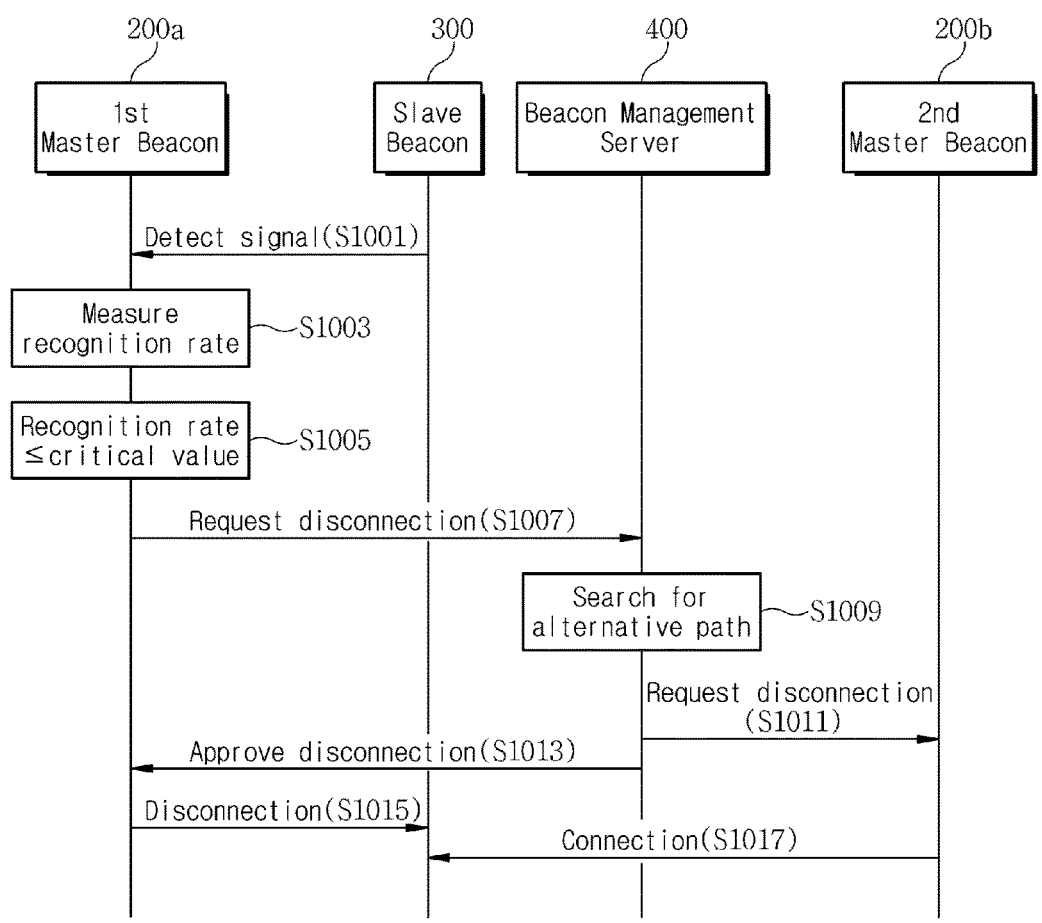
FIGS. 16 to 21 are diagrams illustrating a beacon network construction method according to the second embodiment of the present invention.

Referring to FIG. 16, the first master beacon 200*a* connected with the slave beacon 300 detects a signal emitted periodically from the slave beacon 300 for the maintenance of connection (step S1001).

Then the first master beacon 200*a* measures a recognition rate, namely, a rate of signals detected at predetermined signal strength or more from among signals periodically emitted for a given time by the slave beacon (step S1003). Also, the first master beacon 200*a* compares the signal recognition rate with a predetermined critical value (step S1005).

If the signal recognition rate is equal to or smaller than the critical value, the first master beacon 200*a* sends a disconnection request to the beacon management server 400 so as to release a connection with the slave beacon 300 (step S1007). Then the beacon management server 400 searches for another master beacon capable of managing the slave beacon 300 instead of the first master beacon 200*a*. Namely, the beacon management server 400 that receives the disconnection request searches for an alternative path of the beacon network (step S1009).

If any master beacon (hereinafter, referred to as the second master beacon 200*b*) that replaces the first master beacon 200*a* is found, the beacon management server 400 transmits, to the second master beacon 200*b*, a connection request message that instructs the second master beacon 200*b* to connect with the slave beacon 300 (step S1011).

Also, the beacon management server 400 may transmit a disconnection approval message to the first master beacon 200*a* (step S1013).

The first master beacon 200*a* that receives the disconnection approval message releases a connection with the slave beacon 300 (step S1015). Meanwhile, the second master beacon 200*b* that receives the connection request message performs a connection with the slave beacon 300 (step S1017).

In this case, before transmitting a connection request message to the slave beacon 300, the second master beacon 200*b* may scan the slave beacon 300 while gradually increasing signal emission power thereof.

Figure 17:
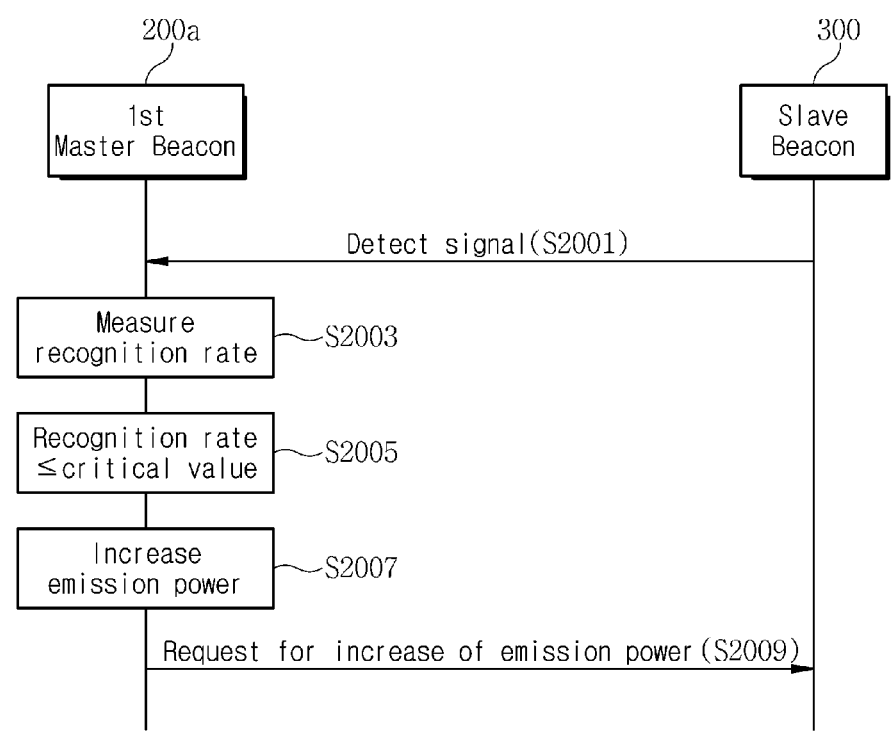

Now, referring to FIG. 17, the first master beacon 200*a* connected with the slave beacon 300 detects a signal emitted periodically from the slave beacon 300 for the maintenance of connection (step S2001).

The first master beacon 200*a* measures a recognition rate, namely, a rate of signals detected at predetermined signal strength or more from among signals periodically emitted for a given time by the slave beacon (step S2003) and then compares the signal recognition rate with a predetermined critical value (step S2005).

If the signal recognition rate is equal to or smaller than the critical value, the first master beacon 200*a* increases signal emission power for the maintenance of connection with the slave beacon 300 (step S2007). Additionally, the first master beacon 200*a* may request the slave beacon 300 to increase signal emission power for the maintenance of connection (step S2009).

Steps S2007 and S2009 may be performed sequentially, simultaneously, or selectively. For example, if it is possible to increase the signal recognition rate above the predetermined critical value by only increasing the emission power of the first master beacon 200*a*, step S2009 may be omitted. Similarly, if it is possible to increase the signal recognition rate above the predetermined critical value by only increasing the emission power of the slave beacon 300, step S2007 may be omitted.

Namely, it is possible to increase the emission power of one or both of the first master beacon 200*a* and the slave beacon 300. The beacon(s) for increasing the emission power may be selected by considering the beacon network connectivity, a battery life, a residual battery amount, and/or the like.

Meanwhile, the signal recognition rate may be measured again after the emission power of both or one of the first master beacon 200*a* and the slave beacon 300 is increased. If the signal recognition rate is still smaller than the predetermined critical value, the beacon network may be reestablished.

Figure 18:
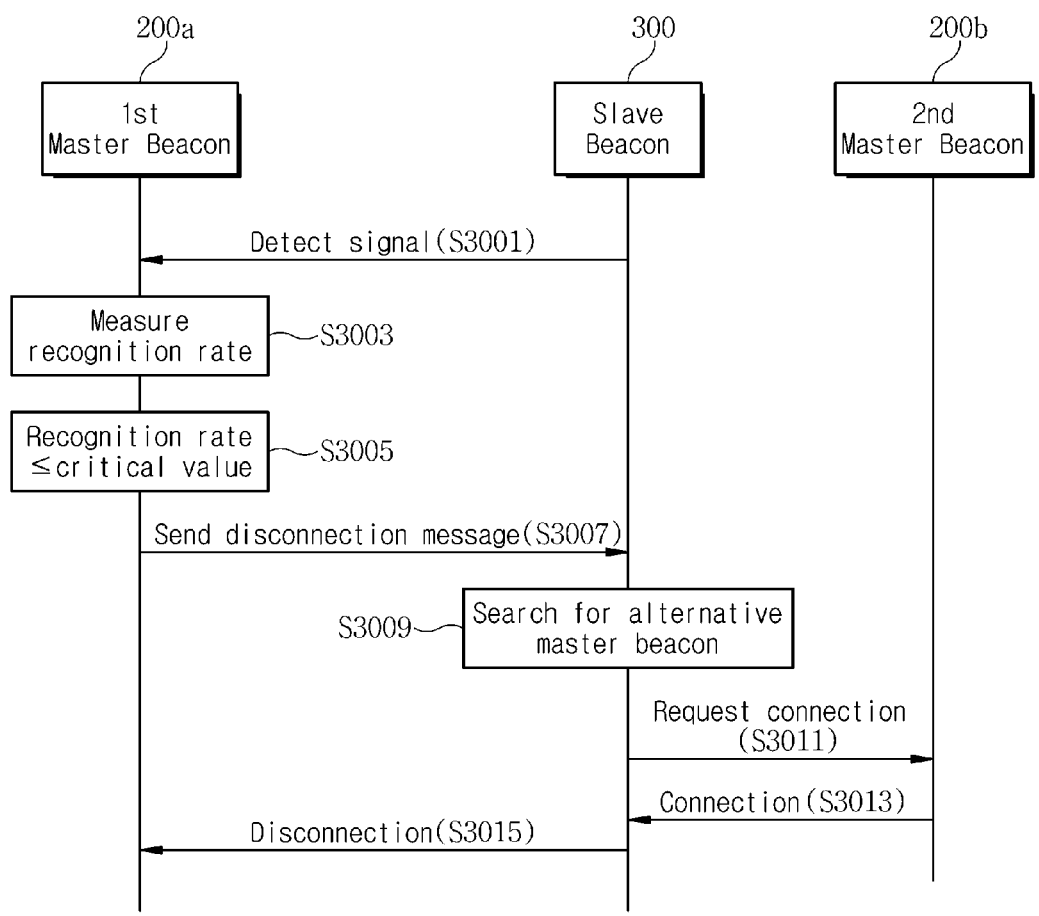

Namely, if the signal recognition rate is still smaller than the predetermined critical value after step S2009, the first master beacon 200*a* may perform again a process from step S1007 shown in FIG. 16 or step S3007 shown in FIG. 18.

Additionally, the critical value and an allowable upper limit of the emission power of the first master beacon 200*a* and the slave beacon 300 may be defined by a user or a manager in view of beacon network environments, a battery life, and the like.

Now, referring to FIG. 18, the first master beacon 200*a* connected with the slave beacon 300 detects a signal emitted periodically from the slave beacon 300 for the maintenance of connection (step S3001).

The first master beacon 200*a* measures a recognition rate, namely, a rate of signals detected at predetermined signal strength or more from among signals periodically emitted for a given time by the slave beacon (step S3003) and then compares the signal recognition rate with a predetermined critical value (step S3005).

If the signal recognition rate is greater than the critical value, the first master beacon 200*a* may maintain a connection with the slave beacon 300.

However, if the signal recognition rate is equal to or smaller than the critical value, the first master beacon 200*a* transmits a disconnection message to the slave beacon 300 (step S3007).

The slave beacon 300 that receives the disconnection message may search for another master beacon capable of being connected thereto, i.e., the second master beacon 200*b*, instead of the first master beacon 200*a* (step S3009).

At this step, the slave beacon 300 may scan the second master beacon 200*b* while gradually increasing the signal emission power thereof.

Of course, the first master beacon 200*a* should be excluded from a scanning target of the slave beacon 300 since this embodiment is based on the assumption that a connection between the first master beacon 200*a* and the slave beacon 300 is inefficient or inadequate.

When the second beacon 200*b* suitable for connection with the slave beacon 300 is found, the slave beacon 300 transmits a connection request message to the second master beacon 200*b* (step S3011).

The second master beacon 200*b* that receives the connection request message transmits a response message to the slave beacon 300 and performs a connection with the slave beacon 300 (step S3013).

Then the slave beacon 300 connected with the second master beacon 200*b* transmits a disconnection approval message to the first master beacon 200*a* and release a connection with the first master beacon 200*a* (step S3015).

In this case, steps S3013 and S3015 may be performed sequentially or simultaneously, and step S3015 may be performed before step S3013.

Hereinafter, the beacon network construction method according to the second embodiment will be described focusing the operation of the master beacon.

Figure 19:
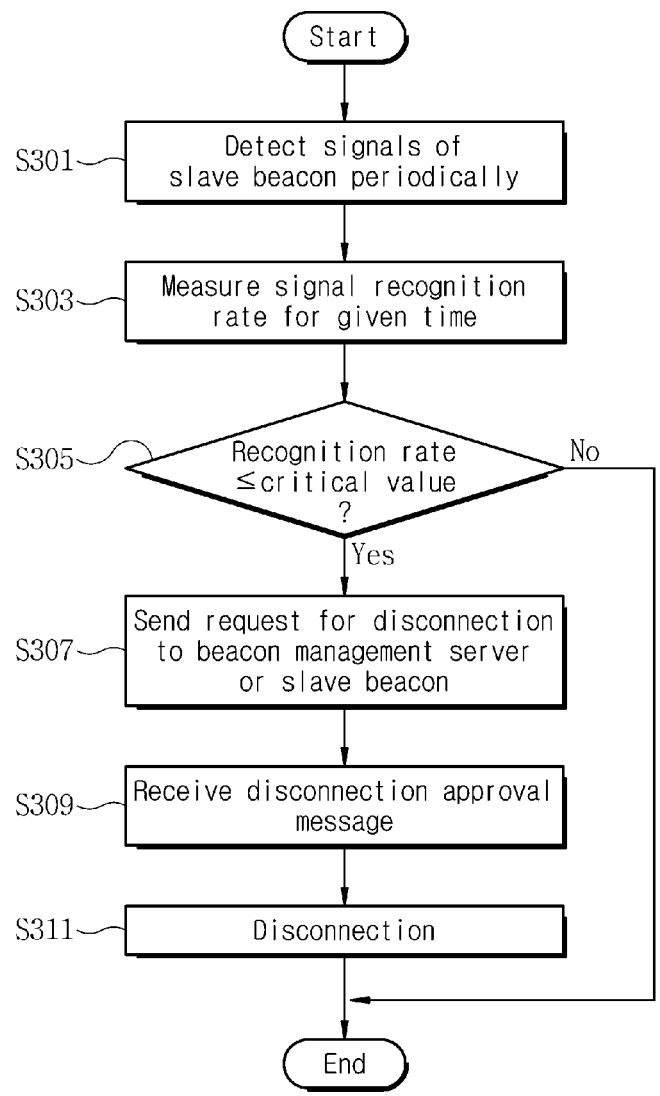

Referring to FIG. 19, the first master beacon 200*a* periodically detects a signal for the maintenance of connection from the slave beacon 300 (step S301), and measures a recognition rate, namely, a rate of signals detected at predetermined signal strength or more from among signals periodically emitted for a given time (step S303).

Then the first master beacon 200*a* determines whether the signal recognition rate does not exceed a predetermined critical value (step S305). If the signal recognition rate is greater than the critical value, the first master beacon 200*a* may maintain a connection with the slave beacon 300. However, if the signal recognition rate is equal to or smaller than the critical value, the first master beacon 200*a* transmits a disconnection request message to the slave beacon 300 (step S307).

Thereafter, the first master beacon 200*a* receives a disconnection approval message from the beacon management server 400 or the slave beacon 300 (step S309) and then releases a connection with the slave beacon 300 (step S311).

Figure 20:
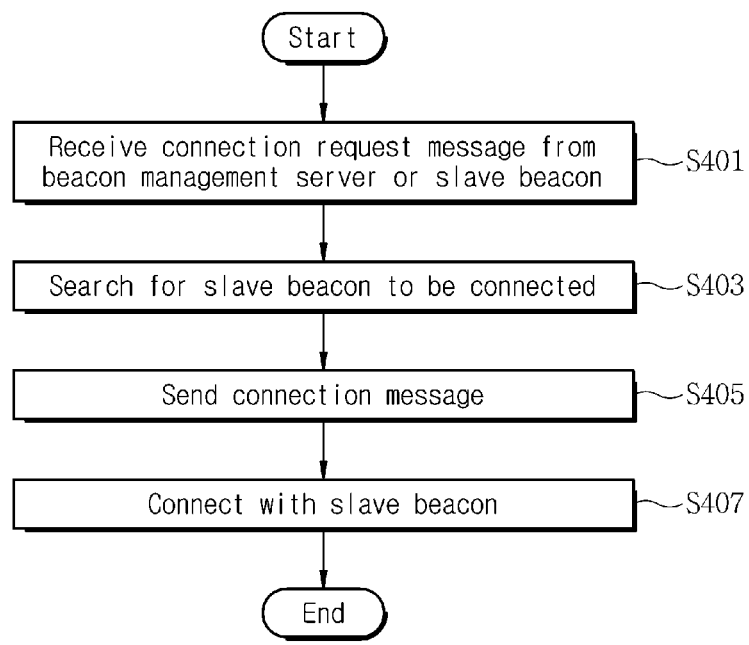

Meanwhile, as shown in FIG. 20, the second master beacon 200*b* may receive a connection request message from the beacon management server 400 or the slave beacon 300 (step S401).

Then the second master beacon 200*b* may search for the slave beacon 300 to be connected, while gradually increasing signal emission power (step S403).

If the slave beacon 300 is found, the second master beacon 200*b* transmits a connection message to the slave beacon 300 (step S405) and performs a connection with the slave beacon 300 (step S407).

If the second master beacon 200*b* receives the connection request message from the beacon management server 400 at step S401, the connection message transmitted to the slave beacon 300 at step S405 may be the connection request message. Then if a connection approval message is received from the slave beacon 300, the second master beacon 200*b* may be connected with the slave beacon 300.

On the other hand, if the second master beacon 200*b* receives the connection request message from the slave beacon 300 at step S401, the connection message transmitted to the slave beacon 300 at step S405 may be a connection approval message. After the slave beacon 300 receives the connection approval message, the second master beacon 200*b* may be connected with the slave beacon 300.

Figure 21:
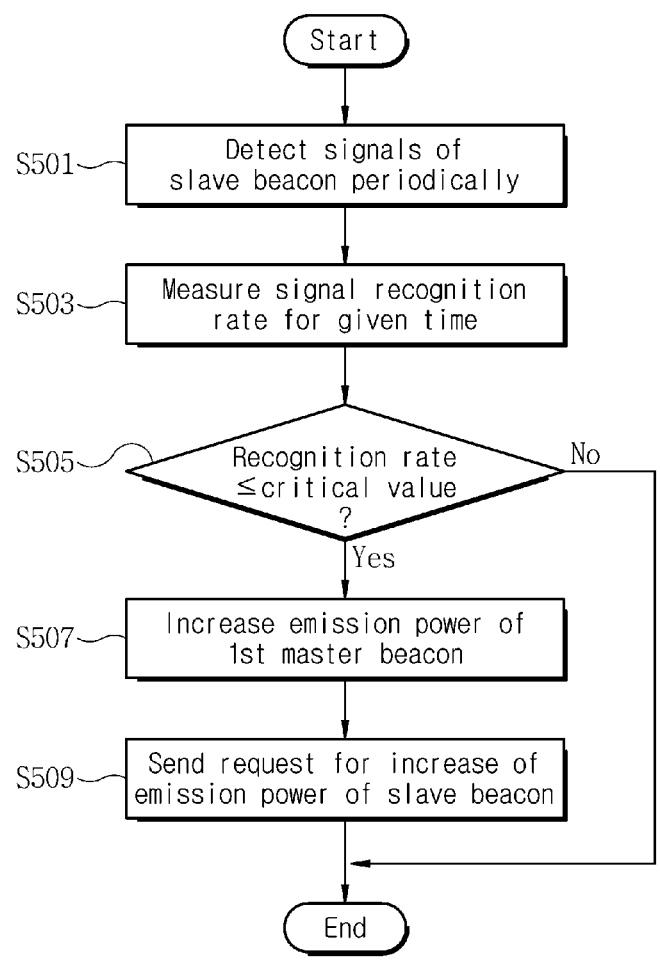

Meanwhile, as shown in FIG. 21, the first master beacon 200*a* periodically detects a signal for the maintenance of connection from the slave beacon 300 (step S501), and measures a recognition rate, namely, a rate of signals detected at predetermined signal strength or more from among signals periodically emitted for a given time (step S503).

Then the first master beacon 200*a* determines whether the signal recognition rate does not exceed a predetermined critical value (step S505). If the signal recognition rate is greater than the critical value, the first master beacon 200*a* may maintain a connection with the slave beacon 300. However, if the signal recognition rate is equal to or smaller than the critical value, the first master beacon 200*a* may increase the signal emission power thereof (step S507) or request the slave beacon 300 to increase the signal emission power thereof (step S509).

Steps S507 and S509 may be performed sequentially, simultaneously, or selectively.

In case of transmitting a request for an increase of emission power to the slave beacon 300 at step S509, the slave beacon 300 may increase the signal emission power thereof in response to the request since the slave beacon 300 is managed by the first master beacon 200*a*.

The signal recognition rate may be measured again after the emission power is increased. If the signal recognition rate is still smaller than the predetermined critical value, the first master beacon 200*a* may transmit a disconnection request to the beacon management server 400 or the slave beacon 300.

Namely, if the signal recognition rate is still smaller than the predetermined critical value even though the emission power is increased, a process from step S307 shown in FIG. 19 may be performed.

Described hereinbefore is the beacon network construction method according to the second embodiment.

Hereinafter, the beacon network construction method according to the third embodiment will be described with reference to FIGS. 22 to 24.

Figure 22:
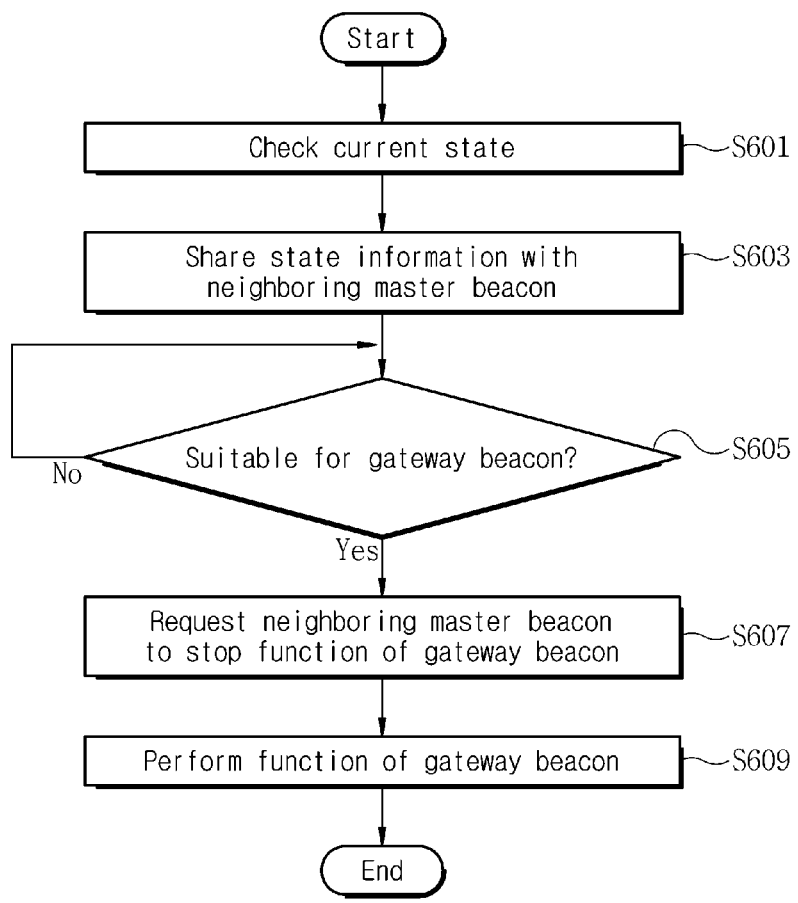
FIGS. 22 to 24 are diagrams illustrating a beacon network construction method according to the third embodiment of the present invention.
Figure 23:
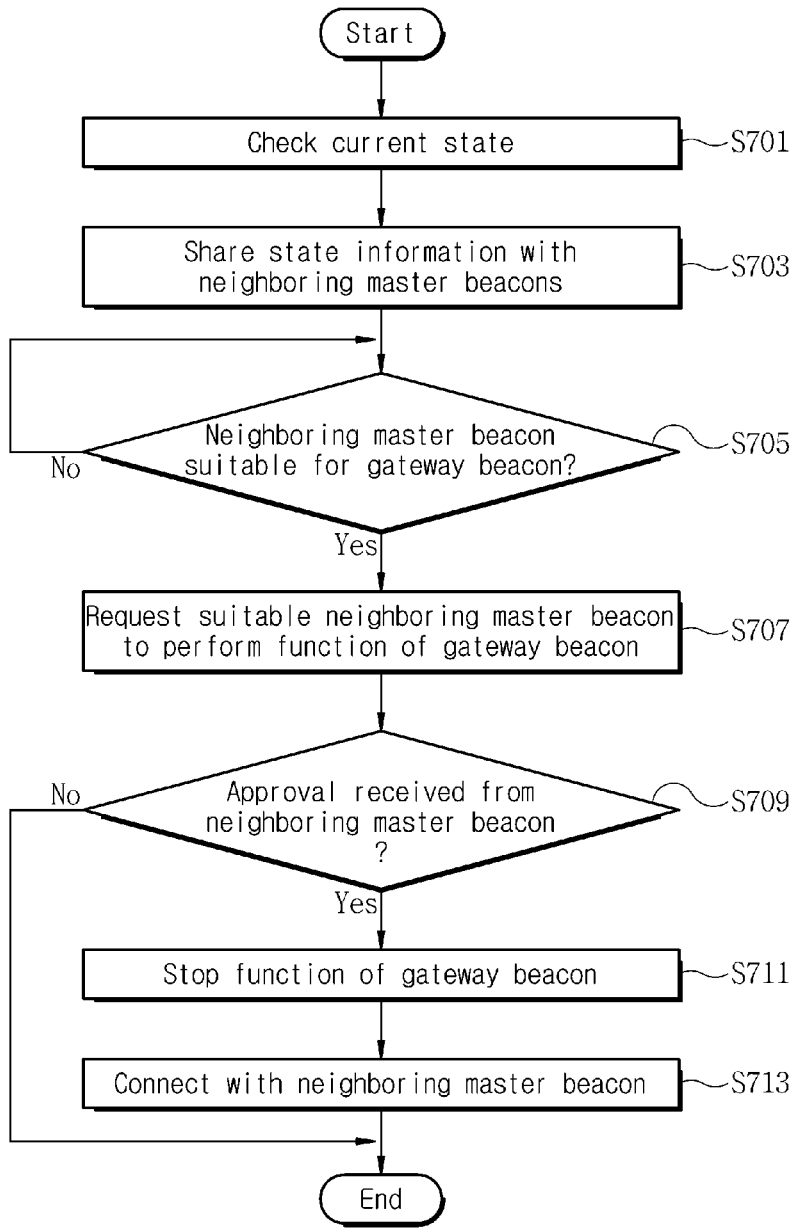
Figure 24:
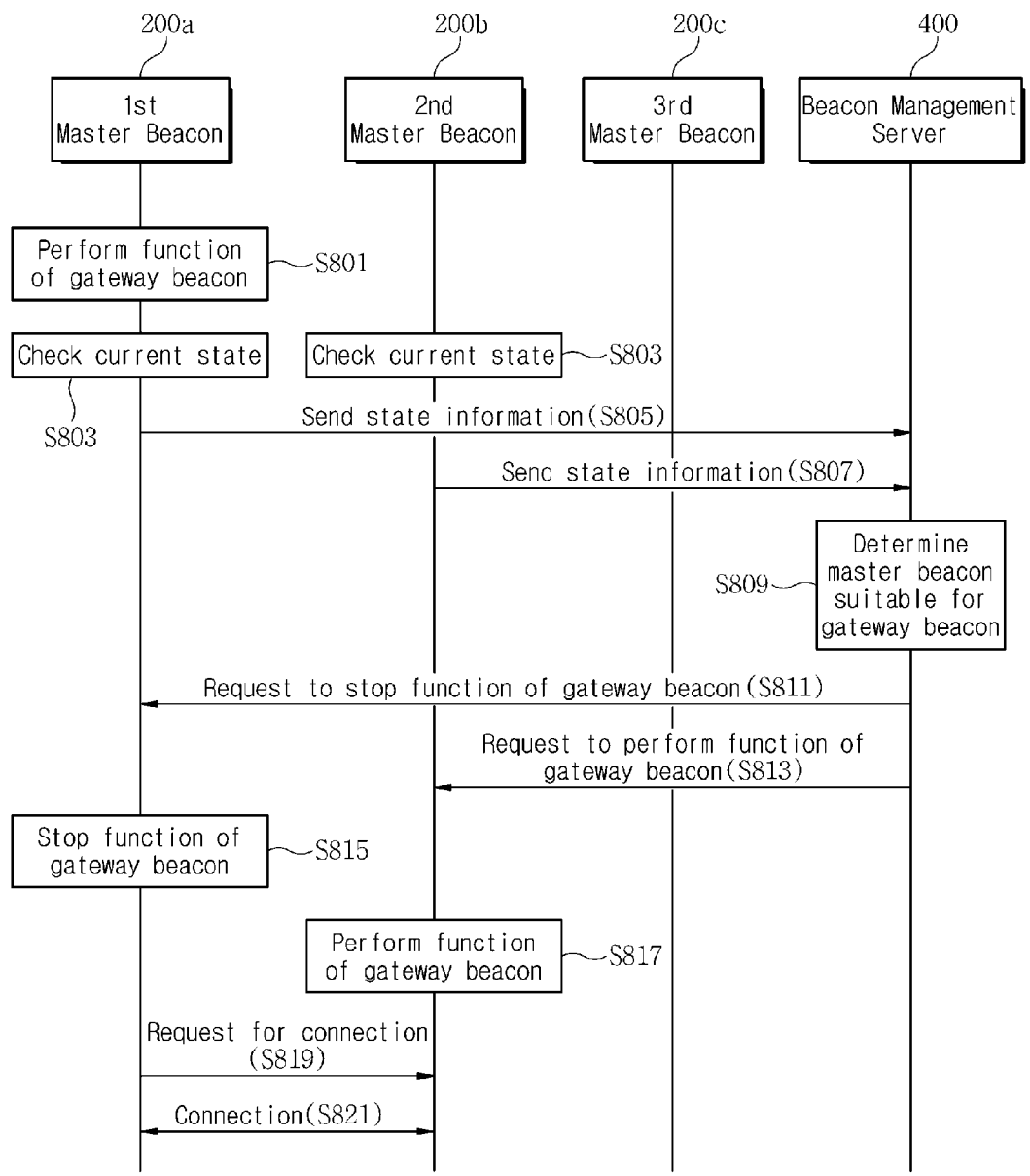

FIGS. 22 to 24 are diagrams illustrating a beacon network construction method according to the third embodiment of the present invention.

Referring to FIG. 22, it is supposed that the first master beacon 200*a* as shown in FIG. 3 currently performs the function of a gateway. In this disclosure, the function of a gateway refers to a state where a certain master beacon, e.g., the first master beacon 200*a*, is connected with the communication network 100 through the AP device 500 and also connected with any other master beacon and/or the slave beacon. On the other hand, another master beacon such as the second master beacon 200*b* connected with the communication network 100 through the AP device 500 has the ability to perform the function of a gateway.

Shown in FIG. 22 is one example of the beacon network construction method according to the third embodiment. In this example, the second master beacon 200*b*, other than the first master beacon 200*a* which currently performs the function of a gateway, determines a master beacon that will perform the function of a gateway beacon.

For example, the second master beacon 200*b* checks a current state (step S601) and shares state information with neighboring master beacons (step S603). The state information may include information about the number of currently connected beacon devices, the number of terminal devices, a state of connection with the AP device 500, a resource environment, and the like. The state information may be transmitted through a certain communication module, based on, e.g., WiFi protocol, which is different from the communication module for emitting a beacon signal. Namely, for a share of information among master beacons, a specific communication protocol which allows the master beacon only to deliver information, namely, disallows the slave beacon to receive information, is used.

The second master beacon 200*b* may compare the received state information with the state information thereof and then determine whether the second master beacon 200*b* is suitable for a gateway beacon (step S605). For example, if it is determined that the first master beacon 200*a* has insufficient resources due to too many beacon nodes currently connected, the second master beacon 200*b* requests the first master beacon 200*a* to stop the function of a gateway beacon (step S607).

Then the first master beacon 200*a* may determine whether the request of the second master beacon 200*b* is proper, and therefore transmit an acceptance response or a rejection response to the second master beacon 200*b*.

If the acceptance response is received from the first master beacon 200*a*, the second master beacon 200*b* may perform the function of a gateway beacon (step S609). In certain situations, the acceptance response from the first master beacon 200*a* may be omitted.

Additionally, the second master beacon 200*b* may receive connection setting information about connected beacon devices from the first master beacon 200*a* and then perform a process of connecting with all or some of such beacon devices. Also, if the first master beacon 200*a* is connected in a slave beacon state, the second master beacon 200*b* may receive information about other beacon devices connected with the first master beacon 200*a* and then maintain connections with such beacon devices.

Additionally, the second master beacon 200*b* may offer information about the second master beacon 200*b* to beacon devices connected with the first master beacon 200*a* such that the connected beacon devices can be connected with the second master beacon 200*b*.

Now, another example of the beacon network construction method according to the second embodiment will be described with reference to FIG. 23.

Referring to FIG. 23, it is supposed that the first master beacon 200*a* as shown in FIG. 3 currently performs the function of a gateway. As mentioned above, the function of a gateway refers to a state in which a certain master beacon, e.g., the first master beacon 200*a*, is connected with the communication network 100 through the AP device 500 and also connected with at least one master beacon and/or at least one slave beacon. On the other hand, another master beacon such as the second master beacon 200*b* connected with the communication network 100 through the AP device 500 has the ability to perform the function of a gateway.

Contrary to the above-discussed example, in this example, the first master beacon 200*a* determines a master beacon that will perform the function of a gateway beacon.

For example, the first master beacon 200*a* that currently performs the function of a gateway beacon checks a current state (step S701) and shares state information with neighboring master beacons (step S703). As mentioned above, the state information may include information about the number of currently connected beacon devices, the number of terminal devices, a state of connection with the AP device 500, a resource environment, and the like. The state information may be transmitted through a certain communication module, based on, e.g., WiFi protocol, which is different from the communication module for emitting a beacon signal. Namely, for a share of information among master beacons, a specific communication protocol which allows the master beacon only to deliver information, namely, disallows the slave beacon to receive information, is used.

The first master beacon 200*a* may transmit state information thereof to neighboring master beacons through a sharing process and also receive state information from such neighboring master beacons.

Then, using such shared state information, the first master beacon 200*a* may determine whether there is a neighboring master beacon suitable for a gateway beacon (step S705).

If it is determined that the second master beacon 200*b* among neighboring master beacons is suitable for a gateway, the first master beacon 200*a* may request the second master beacon 200*b* to perform the function of a gateway beacon. Namely, when the first master beacon 200*a* has insufficient resources due to too many beacon nodes currently connected, the first master beacon 200*a* may select the second master beacon 200*b* having no connected beacon device or having the ability to connect with any other beacon device, and then request the second master beacon 200*b* to perform the function of a gateway beacon (step S707).

If an acceptance response is received from the second master beacon 200*b* (step S709), the first master beacon 200*a* may stop the function of a gateway beacon (step S711). Then the first master beacon 200*a* may be connected with the second master beacon 200*b* (step S713). In this case, the first master beacon 200*a* may be connected with the second master beacon 200*b* rather than directly connected with the AP device 500. Alternatively, the first master beacon 200*a* may maintain a connection with the AP device 500 and control all or some of the slave beacons 300 to connect with the second master beacon 200*b*. Namely, the first master beacon 200*a* may request the connected slave beacon 300 to release a current connection and thus enable the slave beacon 300 to establish a connection with the second master beacon 200*b*.

Additionally, the first master beacon 200*a* may request the third master beacon 200*c* operating as a slave beacon to connect with the second master beacon 200*b* or to operate as a master beacon, or maintain a connection with the third master beacon 200*c*. Namely, when stopping the function of a gateway beacon, the first master beacon 200*a* may selectively release connections with beacon devices.

Also, the first master beacon 200*a* may determine that the third master beacon 200*c* is much superior in performance to the second master beacon 200*b*. In this case, the first master beacon 200*a* may request the third master beacon 200*c* to perform the function of a gateway beacon, and then the third master beacon 200*c* may change an operating mode to perform the function of a gateway beacon.

Now, still another example of the beacon network construction method according to the second embodiment will be described with reference to FIG. 24.

In this example, the beacon management server 400 determines a master beacon suitable for a gateway beacon.

For example, the first master beacon 200*a* currently performs the function of a gateway beacon (step S801). The first mater beacon 200*a* is connected with the third master beacon 200*c* and at least one slave beacon 300. The first master beacon 200*a* checks a current state (step S803). This step may be performed periodically.

Similarly, the second master beacon 200*b* as well checks a current state (step S803). Contrary to this, the third master beacon 200*c* may not check information about a current state because of currently operating as a slave beacon incapable of communication with the beacon management server 400. However, if necessary, the third master beacon 200*c* may check state information by means of communication with the beacon management server 400 through the first master beacon 200*a*.

After checking state information, the respective master beacons send such state information to the beacon management server 400 (steps S805 and S807). Then the beacon management server 400 may determine a suitable master beacon for a gateway beacon by using the received state information (step S809).

For example, if it is determined that the second master beacon 200*b* is more suitable for a gateway beacon than the first master beacon 200*a* currently performing the function of a gateway beacon, the beacon management server 400 may request the first master beacon 200*a* to stop the function of a gateway beacon (step S811) and also request the second master beacon 200*b* to perform the function of a gateway beacon (step S813). Since knowing information about beacon devices connected with the first master beacon 200*a*, the beacon management server 400 may transmit, to the first master beacon 200*a*, connection setting information which indicates whether to release the connection with all beacon devices, to release the connection with a selected beacon device, or to merely establish a connection with the second master beacon 200*b* while maintaining a current connection. Also, the beacon management server 400 may transmit corresponding information to the second master beacon 200*b*.

The first master beacon 200*a* that receives the request from the beacon management server 400 may immediately stop the function of a gateway beacon without determining whether to accept the request (step S815). At this step, if the connection setting information instructs the first master beacon 200*a* to connect with the second master beacon 200*b* while maintaining connections of all beacon devices, the first master beacon 200*a* may request the second master beacon 200*b* to connect with the first master beacon 200*a* (step S819) and then establish a connection with the second master beacon 200*b* (step S812).

According to this embodiment, if it is determined that a certain master beacon device performing the function of a gateway is connected with too many beacon devices or placed in an abnormal communication state, this master beacon device may stop the function of a gateway and then establish a connection with other master beacon device suitable for a gateway or control connected beacon devices to be connected with the suitable master beacon device. It is therefore possible to construct a more effective beacon network system by dynamically changing the network architecture depending on network circumstances.

Described hereinbefore is the beacon network construction method according to the third embodiment.

Hereinafter, the beacon network construction method according to the fourth embodiment will be described with reference to FIGS. 25 and 26. Specifically, this embodiment relates to a method for changing an operating mode of a beacon device. This method is implemented under the control of a master beacon.

Figure 25:
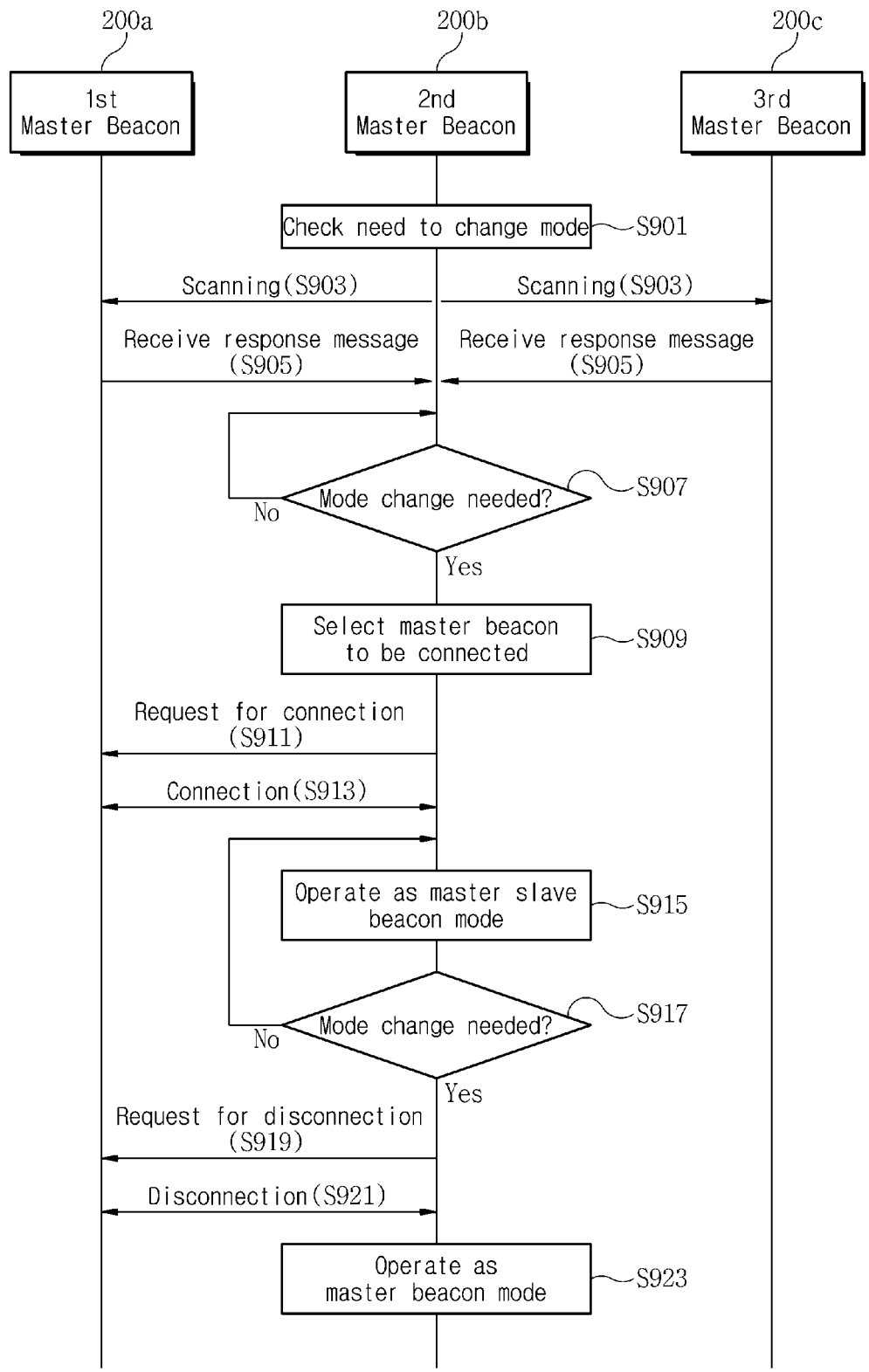
FIGS. 25 and 26 are diagrams illustrating a beacon network construction method according to the fourth embodiment of the present invention.

Referring to FIG. 25, it is supposed that the first master beacon 200*a*, the second master beacon 200*b* and the third master beacon 200*c* are located in a particular area. The number of master beacons located in a particular area is exemplary only, and this invention may be applied to any case in which there are at least two beacon devices.

Additionally, even though it is supposed that the second master beacon 200*b* performs the operating mode change method according to this embodiment, this is exemplary only and not to be construed as a limitation.

In this environment, the second master beacon 200*b* checks a need to change an operating mode at regular intervals (step S901). For example, the second master beacon 200*b* may check a need for a mode change in a cycle of hours, days, or the like. Alternatively or additionally, this check may be performed when a specific situation occurs.

The second master beacon 200*b* performs a process of scanning whether there is any other master beacon (e.g., the first master beacon 200*a* or the third master beacon 200*c*) within a specific range (step S903). At this step, the second master beacon 200*b* may perform the scanning process by emitting a signal based on a WiFi protocol or any other suitable communication protocol. Then the second master beacon 200*b* receives a response message from each of the first and third master beacons 200*a* and 200*c* (step S905). This response message may contain state information about each corresponding master beacon. As mentioned above, the state information may include information about the number of currently connected beacon devices, the number of terminal devices, a state of connection with the AP device 500, resource environments, and the like.

The second master beacon 200*b* compares the received state information with state information thereof and thereby determines whether there is a need to change an operating mode (step S907). Namely, the second master beacon 200*b* determines whether to change a master beacon mode (i.e., a current operating mode) to a master slave beacon mode for performing the function of a slave beacon. For example, if a few beacon devices are connected to the second master beacon 200*b*, if network traffic between the second master beacon 200*b* and the beacon management server 400 is overloaded, or if the number of other master beacons deployed in a certain range exceeds a given value, the second master beacon 200*b* may determine a change of an operating mode.

If it is determined that there is a need to change an operating mode, the second master beacon 200*b* selects a master beacon to be connected among from other master beacons, e.g., the first and third master beacons 200*a* and 200*c*, located in a certain range (step S909). This determination may be based on a comparison of state information received from respective master beacons.

If the first master beacon 200*a* is selected, the second master beacon 200*b* sends a request for connection to the first master beacon 200*a* through the first communication module (e.g., the BLE module) (step S911). After the connection with the first master beacon 200*a* (step S913), the second master beacon 200*b* operates in a master slave beacon mode for performing the function of a slave beacon (step S915). Namely, the second master beacon 200*b* stops the operation of the second communication module so as to terminate the connection with the beacon management server 400 and then operates based on information received from the first master beacon 200*a*. Namely, the first master beacon 200*a* controls the second master beacon 200*b* as a slave beacon.

Thereafter, while operating in a master slave beacon mode, the second master beacon 200*b* may determine again whether there is a need to change an operating mode (step S917). This determination may be performed periodically or in response to the occurrence of a specific situation.

If there is a need to operate again in a master beacon mode, the second master beacon 200*b* sends a request for disconnection to the first master beacon 200*a* (step S919). Then the second master beacon 200*b* releases the connection with the first master beacon 200*a* (step S921) and operates in a master beacon mode (step S923). Namely, the second master beacon 200*b* activates the second communication module for a new connection with the beacon management server 400 and then controls the terminal device and/or the slave beacon connected thereto by delivering suitable information through a direct communication with the beacon management server 400.

On the other hand, the beacon network construction method according to the fourth embodiment may be performed under the control of the beacon management server 400.

This will be described hereinafter with reference to FIG. 26.

Figure 26:
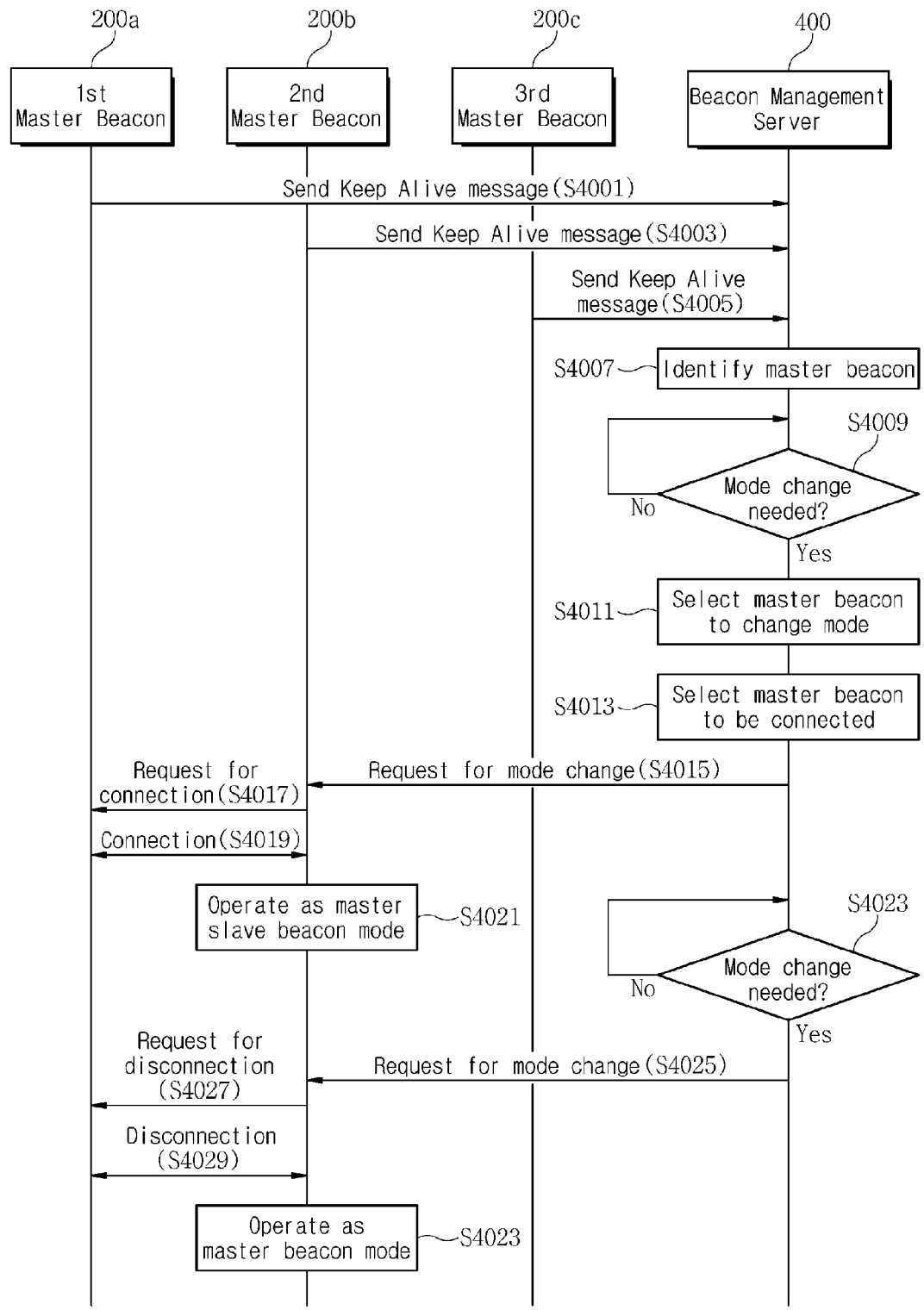

Referring to FIG. 26, the first master beacon 200*a*, the second master beacon 200*b* and the third master beacon 200*c* are located in a particular area. The number of master beacons located in a particular area is exemplary only, and this invention may be applied to any case in which there are at least two beacon devices.

In this environment, each of the first, second and third master beacons 200*a*, 200*b* and 200*c* periodically sends a Keep Alive message to the beacon management server 400 (step S4001, S4003 and S4005).

In this case, the Keep Alive message is a message created after the connection with the beacon management server 400. Namely, after connected with the beacon management server 400, each master beacon may periodically transmit the Keep Alive message containing state information thereof to the beacon management server 400.

Then the beacon management server 400 identifies the master beacons 200*a*, 200*b* and 200*c* that transmit the Keep Alive messages (step S4007). Also, using state information contained in each Keep Alive message, the beacon management server 400 determines whether there is a need to change an operating mode of each master beacon 200a, 200b or 200c (step S4009).

Namely, the beacon management server 400 checks state information in each Keep Alive message and, based on the state information, determines whether to change an operating mode of each master beacon 200a, 200b or 200c. As mentioned above, the state information may include information about the number of currently connected beacon devices, the number of terminal devices, a state of connection with the AP device 500, resource environments, etc. The beacon management server 400 may determine whether to change an operating mode, based on a predetermined condition such as the number of beacon devices connected to each master beacon, a network environment between the beacon management server 400 and each master beacon, the number of other master beacons in a certain region, and the like.

If it is determined that a change of an operating mode is needed, for example, if it is determined that the operating mode of the second master beacon 200b needs to be changed (step S4011), the beacon management server 400 selects other master beacon, e.g., the first master beacon 200a, to be connected to the second master beacon 200b (step S4013). Also, the beacon management server 400 delivers this information to the second master beacon 200b (step S4015).

Then the second master beacon 200b changes an operating mode thereof to a master slave beacon mode under the control of the beacon management server 400, sends a request for connection to the first master beacon 200a, and performs the connection with the first master beacon 200a (steps S4017 and S4019).

If the first master beacon 200a is placed in a situation incapable of connection with the second master beacon 200b, the first master beacon 200a may deny the request of the second master beacon 200b. Then the second master beacon 200b may send this information to the beacon management server 400 and performs the subsequent operation under the control of the beacon management server 400.

If the Keep Alive message is not received from the second master beacon 200b any more, or if the identification information of the second master beacon 200b is set as a slave beacon in the state information received from the first master beacon 200a, the beacon management server 400 may determine that the operating mode of the second master beacon 200b is changed normally.

Meanwhile, the second master beacon 200b connected with the first master beacon 200a releases the connection with the beacon management server 400 and operates in a master slave beacon mode (step S4021).

Thereafter, the beacon management server 400 may periodically receive Keep Alive messages from the first and third master beacons 200a and 200c, check state information contained in each received Keep Alive message, and determine whether a change of an operating mode is needed at each master beacon (step S4023). If it is determined that the second master beacon 200b can operate again in a master beacon mode, the beacon management server 400 may send a request for a mode change to the second master beacon 200b through the first master beacon 200a connected with the second master beacon 200b (step S4025). Then the second master beacon 200b releases the connection with the first master beacon 200a (steps S4027 and S4029) and operates in a master beacon mode through a direct connection with the beacon management server 400 (step S4031).

Described hereinbefore is the beacon network construction method according to the fourth embodiment.

Hereinafter, the beacon network construction method according to the fifth embodiment will be described with reference to FIGS. 27 and 28.

Figure 27:
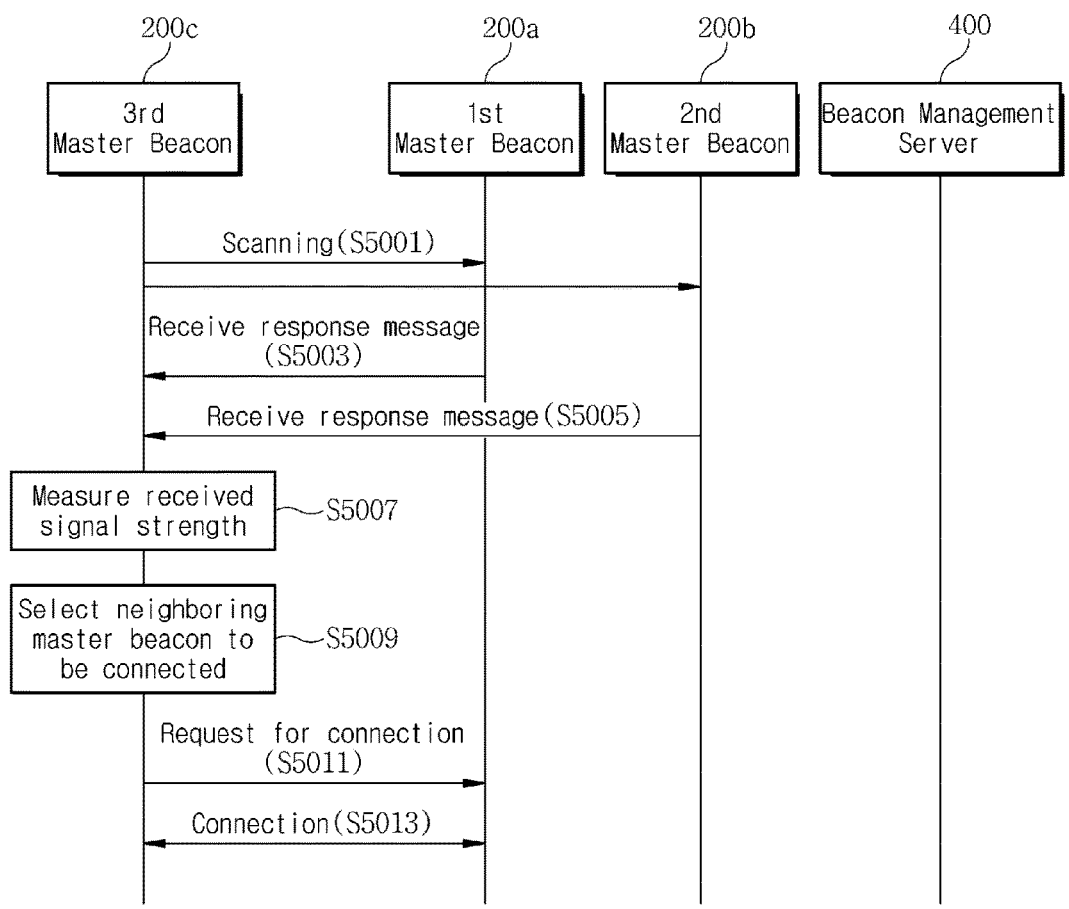
FIGS. 27 and 28 are diagrams illustrating a beacon network construction method according to the fifth embodiment of the present invention.
Figure 28:
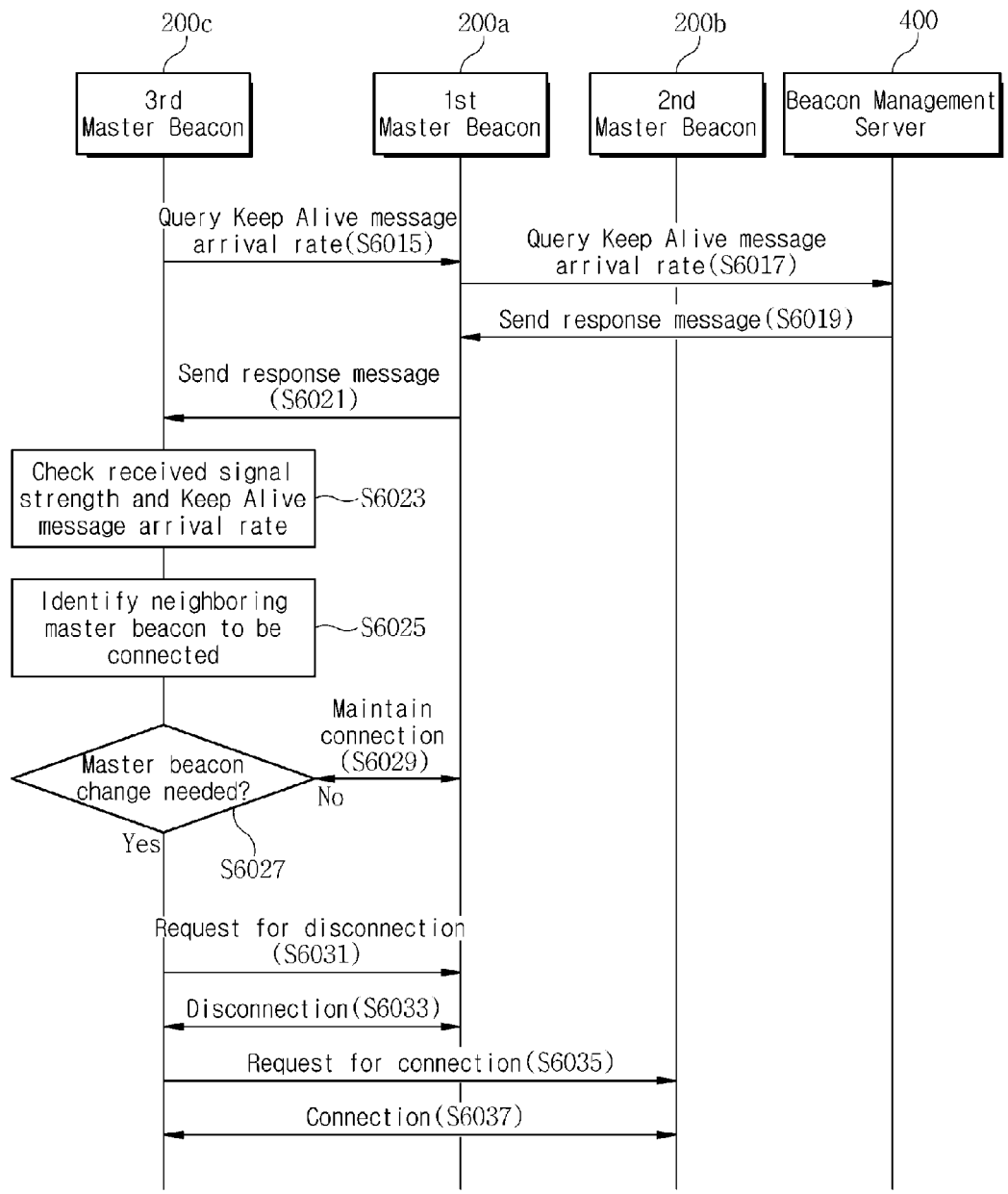

FIGS. 27 and 28 are diagrams illustrating a beacon network construction method according to the fifth embodiment of the present invention. In this embodiment, the beacon management server 400 may monitor and manage an arrival rate of Keep Alive messages with regard to each master beacon.

Namely, each of a plurality of master beacons 200a, 200b and 200c may attach the communication network 100 through connection with the AP device 500 in accordance with WiFi communication protocol or any other equivalent and then access the beacon management server 400. Also, the master beacon 200a, 200b or 200c may manage the slave beacon 300 connected thereto by receiving control information from the beacon management server 400, processing a requested control, or the like. After connected with the beacon management server 400, the master beacon 200a, 200b or 200c periodically transmits the Keep Alive message and thereby maintains a channel link between the master beacon 200 and the beacon management server 400.

Additionally, the beacon management server 400 checks and monitors an arrival rate of the Keep Alive messages with regard to each master beacon 200a, 200b or 200c. Further, the beacon management server 400 stores the Keep Alive message arrival rate of each master beacon 200a, 200b or 200c. Thereafter, if a query about the Keep Alive message arrival rate of a specific master beacon is received from a certain master beacon, the beacon management server 400 retrieves the corresponding message arrival rate and then transmits a response to the query-requesting master beacon.

Additionally, it is supposed in this embodiment that the third master beacon 200c as shown in FIG. 3 has already performed an initial process and then performs the subsequent process of detecting and accessing the already constructed beacon network system. This is, however, exemplary only, and this embodiment may be also applied to any master beacon that has been already connected with the beacon network.

Referring to FIG. 27, the third master beacon 200c may scan any other master beacon (e.g., the first and second master beacons 200a and 200b) within a specific range by using a WiFi protocol or any other suitable communication protocol (step S5001). Then the third master beacon 200c may receive a response message from each of the first and second master beacons 200a and 200b (steps S5003 and S5005).

After receiving the response message, the third master beacon 200c measures the received signal strength of the response message (step S5007). Then, based on the received signal strength, the third master beacon 200c selects a neighboring master beacon to be connected (step S5009). For example, if the received signal strength from the first master beacon 200a is greater than that from the second master beacon 200b, the third master beacon 200c selects the first master beacon 200a as a neighboring master beacon and then sends a request for connection to the first master beacon 200a (step S5011). After connected with the first master beacon 200a (step S5013), the third master beacon 200c may access the beacon management server 400 through the first master beacon 200a.

If it is determined that there is no master beacon within the specific range, the third master beacon 200c may search for and be connected with the AP device 500. Also, the third master beacon 200c may select one of the AP device 500 and other master beacon in view of the received signal strength.

Additionally, after connected with a certain neighboring master beacon on the basis of the received signal strength, the third master beacon 200c may check a message arrival rate of the connected master beacon and then perform a process of maintaining or changing a connection with that master beacon.

This will be described hereinafter with reference to FIG. 28.

Referring to FIG. 28, the third master beacon 200c connected with the first master beacon 200a sends a query about a Keep Alive message arrival rate for each of the first and second master beacons 200a and 200b, found at steps S5001 to S5003, to the beacon management server 400 through the first master beacon 200a (steps S6015 and S6017).

The beacon management server 400 is monitoring a Keep Alive message arrival rate, based on identification information about each connected master beacon, e.g., the first and second master beacons 200a and 200b. If the above query is received from the third master beacon 200c, the beacon management server 400 sends, to the third master beacon 200c, a response message that contains the requested Keep Alive message arrival rate (steps S6019 and S6021). Then the third master beacon 200c receives the response message through the first master beacon 200a.

Thereafter, the third master beacon 200c checks the received signal strength measured at step S5007 and also the Keep Alive message arrival rate received at step S6021 (step S6023) and thereby identifies a neighboring master beacon to be connected (step S6025).

If it is determined that there is no need to change a master beacon (step S6027), the third master beacon 200c maintains the connection with the first master beacon 200a (step S6029). However, if it is determined that there is a need to change a master beacon (step S6027), the third master beacon 200c releases the connection with the first master beacon 200a (steps S6031 and S6033) and also establishes the connection with the second master beacon 200b (steps S6035 and S6037).

As discussed hereinbefore, this invention allows the construction of a more effective beacon network by selecting a neighboring master beacon by considering both the received signal strength and the Keep Alive message arrival rate rather than considering only the received signal strength. Namely, this invention considers a situation in which a certain master beacon has a lower quality of a link channel with the beacon management server 400 even though having good received signal strength. Therefore, in order to easily check the quality of a link channel, this invention uses the Keep Alive message arrival rate.

Hereinbefore, the beacon network construction methods are fully described according various embodiments of this invention.

These methods may be favorably implemented in an operating environment to be discussed hereinafter.

FIG. 29 is a block diagram illustrating an operating environment of an apparatus for supporting a beacon network construction method according to an embodiment of the present invention.

FIG. 29 and the following discussion are intended to provide a brief, general description of an example suitable computing environment in which the invention may be implemented. Although not required (e.g., when implemented in hardware), the invention will be described in the general context of computer-executable instructions, such as program modules, being executed by computer systems.

Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

Referring to FIG. 29, an exemplary computing system for implementing the invention includes a processing unit 11, a system memory 12, and a system bus 10 that couples various system components including the system memory 12 to the processing unit 11.

The processing unit 11 can execute computer-executable instructions designed to implement features of this invention.

The system bus 10 may be any of several, types of bus structures including a memory bus or memory controller, a peripheral bus, and a local bus using any of a variety of bus architectures. The system memory 12 includes read only memory (ROM) 12a and random access memory (RAM) 12b.

A basic input/output system (BIOS) 13a, containing the basic routines that help transfer information between elements within computer system, such as during start-up, may be stored in the ROM 12a.

The computing system may also include a storage unit, e.g., a hard disk drive 15 for reading from and writing to a hard disk, a magnetic disk drive 16 for reading from or writing to a magnetic disk, and an optical disk drive 17 for reading from or writing to an optical disk such as a CD-ROM or other optical media. The hard disk drive 15, the magnetic disk drive 16, and the optical disk drive 17 are connected to the system bus 10 by a hard disk drive interface 18, a magnetic disk drive-interface 19, and an optical drive interface 20, respectively.

Additionally, the computing system may further include an external memory 21 as the storage unit. The external memory 21 may be connected to the system bus 10 through an input/output interface 24.

The drives and their associated computer-readable media provide nonvolatile storage of computer-executable instructions, data structures, program modules, and other data for the computing system. Although the example environment described herein employs the hard disk 15, the magnetic disk 16 and the optical disk 17, other types of computer readable media for storing data can be used, including magnetic cassettes, flash memory cards, digital versatile disks, Bernoulli cartridges, RAMs, ROMs, and the like.

Program code means including one or more program modules, such as an operating system 13b, one or more application programs 13c, other program modules 13d, and program data 13e, may be stored on the hard disk 15, the magnetic disk 16, the optical disk 17, the ROM 12a, or the RAM 12b.

A user may enter commands and information into the computing system through other input device 22 such as a keyboard, a pointing device, a microphone, a joy stick, a game pad, or the like. This other input device 22 can be connected to the processing unit 11 through the input/output interface 24 coupled to the system bus 10. The input/output interface 24 may logically represent any of a wide variety of different interfaces, such as, for example, a serial port interface, a PS/2 interface, a parallel port interface, a universal serial bus (USB) interface, or an institute of electrical and electronics engineers (IEEE) 1394 interface (i.e., a FireWire interface), or may even logically represent a combination of different interfaces.

Additionally, the computing system may further include a display device 26 such as a monitor or LCD and/or an audio device 27 such as a speaker or a microphone, which are connected to the system bus 10 via a video/audio interface 25. The video/audio interface 25 may include high definition multimedia interface (HDMI), graphics device interface (GDI), or the like.

The computing system is connectable to networks, such as, for example, an office-wide or enterprise-wide computer network, a home network, an intranet, and/or the Internet. The computing system can exchange data with external sources, such as, for example, remote computer systems, remote applications, and/or remote databases over such networks.

The computing system includes a network interface 28, through which the computing system receives data from external sources and/or transmits data to external sources. The network interface 28 facilitates the exchange of data with remote devices. For example, if the computing system is the terminal device 300, the terminal device 300 may transmit or receive information to or from the content server 400 through the network interface 28. If the computing system is the content server 400, the content server 400 may transmit or receive information to or from the set-top box 200 and the terminal device 300 through the network interface 28. The network interface 28 can logically represent one or more software and/or hardware modules, such as, for example, a network interface card and corresponding network driver interface specification (NDIS) stack.

Likewise, the computing system receives and/or transmits data from and/or to external sources through the input/output interface 24. The input/output interface 24 is coupled to a modem 23 (e.g., a standard modem, a cable modem, or a digital subscriber line (DSL) modem), through which the computing system receives data from and/or transmits data to external sources.

While FIG. 29 represents a suitable operating environment for the present invention, the principles of the present invention may be employed in any system that is capable of, with suitable modification if necessary, implementing the principles of the present invention. The environment illustrated in FIG. 29 is illustrative only and by no means represents even a small portion of the wide variety of environments in which the principles of the present invention may be implemented.

Various kinds of information generated during the execution of a beacon-based payment service at the beacon service system of this invention may be stored and accessed from any of the computer-readable media associated with the computing system as shown in FIG. 29. For example, portions of such modules and portions of associated program data may be included in the operating system 13b, the application programs 13c, the program modules 13d and/or the program data 13e, for storage in the system memory 12.

When a mass storage device such as the hard disk is coupled to the computing system, such modules and associated program data may also be stored in the mass storage device. In a networked environment, program modules depicted relative to the computing system, or portions thereof, can be stored in a remote computer system connected through the modem 23 or network interface 25 of the input/output interface 24. Execution of such modules may be performed in a distributed environment as previously described.

While the specification contains many specific implementation details, these should not be construed as limitations on the scope of any disclosure or of what may be claimed, but rather as descriptions of features that may be specific to particular embodiments of particular disclosures. Certain features that are described in the specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Also, although the present specifications describe that operations are performed in a predetermined order with reference to a drawing, it should not be construed that the operations are required to be performed sequentially or in the predetermined order, which is illustrated to obtain a preferable result, or that all of the illustrated operations are required to be performed. In some cases, multi-tasking and parallel processing may be advantageous. Also, it should not be construed that the division of various system components are required in all types of implementation. It should be understood that the described program components and systems are generally integrated as a single software product or packaged into a multiple-software product.

While this disclosure has been particularly shown and described with reference to an exemplary embodiment thereof, it will be understood by those skilled in the art that various changes in form and details may be made therein without departing from the scope of this disclosure as defined by the appended claims.

The present invention has a good possibility of sales on the market or business and also has industrial applicability suitable for practical and apparent implementation.

What is claimed is:

1. A beacon network construction method implemented by a master beacon connected with at least one slave beacon to control the slave beacon and connected with at least one neighboring master beacon or a beacon management server to exchange information, the method comprising steps of:
   checking a signal recognition rate measured for signals emitted by the at least one slave beacon for a predetermined time; and
   constructing a beacon network by determining connections with the at least one neighboring master beacon, the at least one slave beacon, and the beacon management server, based on checked information,
   wherein the checking step includes steps of:
   detecting the signals periodically emitted by the at least one slave beacon for the predetermined time;
   measuring the signal recognition rate of the signals detected at predetermined signal strength or more for the predetermined time; and
   if the measured signal recognition rate is smaller than a predetermined critical value, transmitting a request for disconnection to the beacon management server or the slave beacon, and
   wherein the constructing step includes step of establishing a connection with one of the at least one neighboring master beacon after the disconnection from the slave beacon.

2. The method of claim 1, wherein the checking step further includes steps of:
   before the transmitting step,
   increasing emission power of at least one of the slave beacon and the neighboring master beacon; and
   measuring again the signal recognition rate.

3. A beacon network construction method implemented by a master beacon connected with at least one slave beacon to control the slave beacon and connected with at least one neighboring master beacon or a beacon management server to exchange information, the method comprising steps of:
- checking, based on a predetermined condition, whether there is a need to change an operating mode; and
- constructing a beacon network by determining connections with the at least one neighboring master beacon, the at least one slave beacon, and the beacon management server, based on checked information,
- wherein the checking step includes steps of:
- determining whether there is a need to change the operating mode while operating in a master beacon mode; and
- if it is determined that there is a need to change the operating mode, identifying other master beacon to be connected,
- wherein the constructing step includes steps of:
- establishing a connection with the identified master beacon; and
- operating in a master slave beacon mode by releasing a connection with the beacon management server,
- wherein the predetermined condition means compared result of the received state information of neighboring master beacon and the state information thereof, and
- wherein the state information includes at least one of information about the number of currently connected beacon devices, the number of terminal devices, the state of connection with AP device and a resource environment.

4. The method of claim 3, wherein the constructing step further includes steps of:
- after the operating step,
- determining whether there is a need to change the operating mode while operating in the master slave beacon mode;
- if it is determined that there is a need to change the operating mode, releasing the connection with the other master beacon; and
- operating in the master beacon mode by establishing again the connection with the beacon management server.

5. A beacon network construction method implemented by a master beacon connected with at least one slave beacon to control the slave beacon and connected with at least one neighboring master beacon or a beacon management server to exchange information, the method comprising steps of:
- checking, received signal strength of a beacon signal emitted to a terminal device and a arrival rate of a message delivered to the beacon management server; and
- constructing a beacon network by determining connections with the at least one neighboring master beacon, the at least one slave beacon, and the beacon management server, based on checked information,
- wherein the checking step includes steps of:
- scanning at least two other master beacons located in a particular area;
- measuring received signal strength of each signal received from the scanned other master beacons;
- selecting one neighboring master beacon to be connected, based on the received signal strength;
- establishing a connection with the selected neighboring master beacon; and
- sending a query about a message arrival rate for the scanned other master beacons to the beacon management server through the connected neighboring master beacon,
- wherein the constructing step includes steps of:
- finally selecting a specific neighboring master beacon to be connected, based on both the received signal strength and the message arrival rate; and
- establishing a connection with the finally selected neighboring master beacon, and
- wherein the arrival rate is the arrival rate of Keep Alive message.

6. The method of claim 5, wherein the query sending step includes steps of:
- transmitting identification information about the scanned other master beacons to the beacon management server through the connected neighboring master beacon so as to query the message arrival rate; and
- receiving the message arrival rate from the beacon management server through the connected neighboring master beacon.

7. The method of claim 5, wherein the step of establishing the connection with the finally selected neighboring master beacon includes steps of:
- if there is a need for a connection with other master beacon, releasing the connection with the connected neighboring master beacon; and
- sending a request for a connection with the other master beacon.

8. The method of claim 5, wherein the constructing step further includes steps of:
- after the step of establishing the connection with the finally selected neighboring master beacon,
- scanning at least two other master beacons located in a particular area at regular intervals;
- measuring received signal strength of each signal received from the scanned other master beacons and the finally selected neighboring master beacon;
- receiving the message arrival rate corresponding to each of the scanned other master beacons and the finally selected neighboring master beacon from the beacon management server; and
- selecting a suitable neighboring master beacon to be connected, based on both the received signal strength and the message arrival rate.

* * * * *